United States Patent
Kim et al.

(10) Patent No.: US 10,810,789 B2
(45) Date of Patent: Oct. 20, 2020

(54) IMAGE DISPLAY APPARATUS, MOBILE DEVICE, AND METHODS OF OPERATING THE SAME

(71) Applicant: SAMSUNG ELECTRONICS CO., LTD., Suwon-si (KR)

(72) Inventors: Young-il Kim, Seongnam-si (KR); Kwan-sik Yang, Suwon-si (KR); Jeong-rok Jang, Suwon-si (KR); Kil-soo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/795,817

(22) Filed: Oct. 27, 2017

(65) Prior Publication Data

US 2018/0122130 A1    May 3, 2018

(30) Foreign Application Priority Data

Oct. 28, 2016    (KR) .................. 10-2016-0142155

(51) Int. Cl.
   *G06T 15/20*    (2011.01)
   *G06T 3/00*    (2006.01)
   (Continued)

(52) U.S. Cl.
   CPC .......... *G06T 15/205* (2013.01); *G06F 3/0485* (2013.01); *G06F 3/04847* (2013.01);
   (Continued)

(58) Field of Classification Search
   CPC ... G06T 15/205; G06T 3/0031; G06T 3/0043; G06T 3/40; G06T 19/20; G06T 2200/16;
   (Continued)

(56) References Cited

U.S. PATENT DOCUMENTS 6,616,703 B1 *   9/2003   Nakagawa ............ G06F 17/273
                                                    704/10
6,778,699 B1 *   8/2004   Gallagher ............ G06K 9/4604
                                                    382/165
(Continued)

FOREIGN PATENT DOCUMENTS

CN    102065335 A    5/2011
CN    102111672 A    6/2011
(Continued)

OTHER PUBLICATIONS

Communication dated Feb. 1, 2018 by the International Searching Authority in counterpart International Patent Application No. PCT/KR2017/011843. (PCT/ISA/210, PCT/ISA/220 & PCT/ISA/237).
(Continued)

*Primary Examiner* — Charles L Beard
(74) *Attorney, Agent, or Firm* — Sughrue Mion, PLLC

(57) ABSTRACT

A mobile device is provided. The mobile device may include a communication interface; a display; a memory configured to store one or more instructions; and at least one processor configured to execute the one or more instructions stored in the memory to: control the communication interface to communicate with an image display apparatus; control a viewpoint of a 360-degree image based on an input; and control the communication interface to transmit, to the image display apparatus, at least one among an image corresponding to the viewpoint of the 360-degree image, and viewpoint control information corresponding to the viewpoint of the 360-degree image.

20 Claims, 13 Drawing Sheets

(51) Int. Cl.
| | |
|---|---|
| *G06T 3/40* | (2006.01) |
| *G06T 19/20* | (2011.01) |
| *G06F 3/0484* | (2013.01) |
| *G06F 3/147* | (2006.01) |
| *G06F 3/14* | (2006.01) |
| *G06F 3/0485* | (2013.01) |
| *H04N 1/00* | (2006.01) |

(52) U.S. Cl.
CPC ............... *G06F 3/14* (2013.01); *G06F 3/147* (2013.01); *G06F 3/1454* (2013.01); *G06T 3/00* (2013.01); *G06T 3/0031* (2013.01); *G06T 3/0043* (2013.01); *G06T 3/40* (2013.01); *G06T 19/20* (2013.01); *G06F 2203/04802* (2013.01); *G06F 2203/04806* (2013.01); *G06F 2200/16* (2013.01); *G06T 2219/2021* (2013.01); *H04N 1/00106* (2013.01)

(58) Field of Classification Search
CPC .............. G06T 2219/2021; G06T 3/00; H04N 1/00106; G06F 3/04847; G06F 3/0485; G06F 3/14; G06F 3/1454; G06F 3/147; G06F 2203/04802; G06F 2203/04806
See application file for complete search history.

(56) References Cited

U.S. PATENT DOCUMENTS

| | | | | |
|---|---|---|---|---|
| 6,968,094 | B1* | 11/2005 | Gallagher | G06K 9/209 348/E5.046 |
| 7,893,963 | B2* | 2/2011 | Gallagher | H04N 5/23248 348/208.6 |
| 8,111,949 | B2* | 2/2012 | Sakurai | G06T 3/0006 348/672 |
| 8,274,506 | B1 | 9/2012 | Rees | |
| 8,378,985 | B2* | 2/2013 | Thorn | G06F 3/0488 345/173 |
| 8,438,297 | B1* | 5/2013 | Chen | H04L 29/00 709/203 |
| 8,707,354 | B1* | 4/2014 | Moreau | H04N 21/4524 725/37 |
| 8,786,751 | B2* | 7/2014 | Kinoshita | H04N 5/23293 348/333.02 |
| 8,878,875 | B2* | 11/2014 | Park | G06F 1/1626 345/173 |
| 8,976,303 | B2 | 3/2015 | Murugesan | |
| 9,411,512 | B2* | 8/2016 | Song | G06F 3/04886 |
| 9,411,789 | B1* | 8/2016 | Chitta | G06F 16/954 |
| 9,418,539 | B2* | 8/2016 | In | G08C 17/02 |
| 9,478,012 | B2* | 10/2016 | Uratani | G06T 3/606 |
| 9,609,205 | B2* | 3/2017 | Morimoto | H04N 5/232 |
| 9,716,828 | B2 | 7/2017 | Yoo et al. | |
| 9,723,123 | B2* | 8/2017 | Yuan | H04M 1/72533 |
| 9,728,007 | B2* | 8/2017 | Hakkarainen | H04N 5/23293 |
| 9,749,575 | B1* | 8/2017 | Lee | G09G 5/14 |
| 9,767,613 | B1* | 9/2017 | Bedikian | G06T 19/006 |
| 9,830,052 | B2* | 11/2017 | Seo | G06F 3/04842 |
| 9,838,874 | B2* | 12/2017 | Lee | H04W 12/08 |
| 9,864,566 | B2* | 1/2018 | Yamaguchi | G06F 3/147 |
| 9,906,593 | B2* | 2/2018 | Ohashi | H04L 67/104 |
| 9,921,793 | B2* | 3/2018 | Park | G06F 3/1423 |
| 9,928,020 | B2* | 3/2018 | Jang | G06F 3/14 |
| 9,996,311 | B2* | 6/2018 | Gates | G06F 3/1454 |
| 10,004,061 | B2* | 6/2018 | Iwami | H04N 21/436 |
| 10,019,131 | B2* | 7/2018 | Welker | G06F 3/0304 |
| 10,021,180 | B2* | 7/2018 | Chen | G06F 3/0488 |
| 10,021,297 | B2* | 7/2018 | Kwon | G06F 3/017 |
| 10,043,537 | B2* | 8/2018 | Jang | H04L 12/282 |
| 10,055,064 | B2* | 8/2018 | Tokutake | G06F 3/0425 |
| 10,104,282 | B2* | 10/2018 | Graham | G06T 7/73 |
| 10,254,942 | B2* | 4/2019 | Vranjes | G06F 3/04847 |
| 10,264,297 | B1* | 4/2019 | Gang | H04N 21/235 |
| 10,327,027 | B2* | 6/2019 | Liao | H04N 21/2743 |
| D857,722 | S* | 8/2019 | Musienko | D14/486 |
| 10,437,413 | B2* | 10/2019 | Murakami | G06F 3/04886 |
| 10,448,107 | B2* | 10/2019 | Kim | H04N 21/4383 |
| 10,477,266 | B2* | 11/2019 | Bigio | H04N 21/43637 |
| 10,573,060 | B1* | 2/2020 | Ascolese | A63F 13/428 |
| 10,623,635 | B2* | 4/2020 | Wang | G11B 27/34 |
| 2005/0195128 | A1* | 9/2005 | Sefton | A63B 71/0622 345/7 |
| 2006/0132482 | A1* | 6/2006 | Oh | G06T 3/0012 345/419 |
| 2006/0132675 | A1* | 6/2006 | Choi | G06F 1/1626 349/76 |
| 2007/0157126 | A1* | 7/2007 | Tschirhart | B60K 35/00 715/848 |
| 2008/0218587 | A1* | 9/2008 | Glatt | G03B 37/00 348/39 |
| 2009/0160933 | A1* | 6/2009 | Herz | G06T 3/00 348/43 |
| 2009/0189917 | A1* | 7/2009 | Benko | G06F 3/14 345/647 |
| 2009/0197635 | A1* | 8/2009 | Kim | G06F 3/0346 455/550.1 |
| 2010/0123736 | A1* | 5/2010 | Fukudome | G06F 3/0481 345/649 |
| 2011/0037851 | A1* | 2/2011 | Kim | G06F 3/04847 348/143 |
| 2011/0119713 | A1 | 5/2011 | Chang et al. | |
| 2011/0141293 | A1* | 6/2011 | Yoneyama | H04N 1/00283 348/207.1 |
| 2012/0017147 | A1* | 1/2012 | Mark | H04N 9/3173 715/702 |
| 2012/0092348 | A1* | 4/2012 | McCutchen | G06T 3/00 345/474 |
| 2012/0174038 | A1* | 7/2012 | Tamayo | G06F 3/0482 715/849 |
| 2012/0185790 | A1* | 7/2012 | Bae | G06F 3/0488 715/769 |
| 2012/0194637 | A1* | 8/2012 | Han | G06F 3/0416 348/36 |
| 2012/0209916 | A1* | 8/2012 | Azuma | H04L 12/2814 709/204 |
| 2012/0235995 | A1 | 9/2012 | Lou et al. | |
| 2012/0242687 | A1* | 9/2012 | Choi | B60K 35/00 345/629 |
| 2012/0281960 | A1* | 11/2012 | Boncha | H04N 5/772 386/224 |
| 2013/0027613 | A1* | 1/2013 | Kim | H04N 21/4126 348/563 |
| 2013/0033568 | A1 | 2/2013 | Kim et al. | |
| 2013/0044108 | A1* | 2/2013 | Tanaka | G06T 15/20 345/419 |
| 2013/0050260 | A1 | 2/2013 | Reitan | |
| 2013/0100132 | A1* | 4/2013 | Katayama | H04N 13/275 345/420 |
| 2013/0129308 | A1* | 5/2013 | Karn | H04N 5/772 386/230 |
| 2013/0152129 | A1* | 6/2013 | Alberth | H04N 21/4312 725/41 |
| 2013/0247114 | A1 | 9/2013 | Kobayashi | |
| 2013/0258195 | A1* | 10/2013 | Chung | H04N 21/4183 348/554 |
| 2013/0278484 | A1* | 10/2013 | Hwang | G06F 3/1423 345/2.3 |
| 2013/0328747 | A1* | 12/2013 | Yoneda | G06F 3/1423 345/3.1 |
| 2014/0009394 | A1* | 1/2014 | Lee | H04N 5/4403 345/157 |
| 2014/0063181 | A1* | 3/2014 | Lee | G06T 3/0025 348/36 |
| 2014/0078102 | A1* | 3/2014 | Araki | G06F 3/016 345/174 |
| 2014/0098095 | A1* | 4/2014 | Lee | G06F 3/041 345/420 |
| 2014/0123177 | A1* | 5/2014 | Kim | H04N 21/47202 725/34 |

(56) References Cited

U.S. PATENT DOCUMENTS

| | | | |
|---|---|---|---|
| 2014/0125554 A1* | 5/2014 | Pan | G06T 3/40 345/2.2 |
| 2014/0141721 A1* | 5/2014 | Kim | H04W 76/14 455/41.2 |
| 2014/0152655 A1* | 6/2014 | Johnston | H04N 5/2259 345/419 |
| 2014/0210940 A1* | 7/2014 | Barnes | H04N 5/23293 348/36 |
| 2014/0218289 A1* | 8/2014 | Dai | H04M 1/72533 345/157 |
| 2014/0223490 A1* | 8/2014 | Pan | H04N 21/42224 725/61 |
| 2014/0327616 A1* | 11/2014 | Suzuki | G09B 29/006 345/157 |
| 2014/0330841 A1* | 11/2014 | Barrett | G06F 16/951 707/748 |
| 2014/0375760 A1* | 12/2014 | Lee | H04N 5/23238 348/36 |
| 2015/0062289 A1* | 3/2015 | Yoo | H04N 5/23216 348/36 |
| 2015/0077326 A1* | 3/2015 | Kramer | G06F 3/0325 345/156 |
| 2015/0082058 A1* | 3/2015 | Hahm | G06F 3/1454 713/320 |
| 2015/0082241 A1* | 3/2015 | Kang | H04N 7/15 715/803 |
| 2015/0097757 A1* | 4/2015 | Bang | G06F 3/1454 345/2.2 |
| 2015/0120777 A1* | 4/2015 | Ramos | G06F 3/016 707/776 |
| 2015/0128046 A1* | 5/2015 | Cormican | G06F 3/0412 715/720 |
| 2015/0189357 A1* | 7/2015 | Kim | H04N 21/4227 725/110 |
| 2015/0264259 A1* | 9/2015 | Raghoebardajal | H04N 5/23238 348/36 |
| 2015/0271402 A1* | 9/2015 | Guo | H04N 5/23293 348/39 |
| 2015/0278987 A1* | 10/2015 | Mihara | H04N 5/23238 345/427 |
| 2015/0301702 A1* | 10/2015 | Kim | G06F 16/583 715/810 |
| 2015/0312409 A1* | 10/2015 | Czarnecki | H04M 3/42382 455/414.1 |
| 2015/0348580 A1* | 12/2015 | van Hoff | G11B 19/20 348/38 |
| 2015/0358612 A1* | 12/2015 | Sandrew | H04N 13/261 348/36 |
| 2015/0358613 A1* | 12/2015 | Sandrew | H04N 13/261 348/36 |
| 2016/0005435 A1* | 1/2016 | Campbell | H04N 9/806 386/240 |
| 2016/0006864 A1* | 1/2016 | Park | H04N 21/4126 715/835 |
| 2016/0014336 A1* | 1/2016 | Han | H04N 5/23238 348/36 |
| 2016/0080650 A1* | 3/2016 | Okazawa | H04N 21/4312 348/36 |
| 2016/0086306 A1* | 3/2016 | Nishimaki | H04N 5/23238 345/620 |
| 2016/0086386 A1* | 3/2016 | Son | G02B 27/017 345/633 |
| 2016/0127799 A1 | 5/2016 | Alsina et al. | |
| 2016/0132991 A1* | 5/2016 | Fukushi | A63F 13/5255 345/667 |
| 2016/0216852 A1* | 7/2016 | Lee | G06F 3/0482 |
| 2016/0219319 A1* | 7/2016 | Servignat | H04N 21/25841 |
| 2016/0241767 A1* | 8/2016 | Cho | H04N 5/23203 |
| 2016/0262198 A1* | 9/2016 | Gardner, III | H04W 76/11 |
| 2016/0345254 A1* | 11/2016 | Iwami | H04L 65/4069 |
| 2016/0352791 A1* | 12/2016 | Adams | H04L 65/4069 |
| 2016/0353425 A1* | 12/2016 | Iwami | H04N 21/436 |
| 2016/0359932 A1* | 12/2016 | Cho | H04L 65/4046 |
| 2016/0360104 A1* | 12/2016 | Zhang | H04N 13/239 |
| 2017/0052393 A1* | 2/2017 | Kweon | G02C 13/003 |
| 2017/0075416 A1* | 3/2017 | Armstrong | G06F 3/011 |
| 2017/0078653 A1* | 3/2017 | Bi | G06T 3/0062 |
| 2017/0094278 A1* | 3/2017 | Bickerstaff | G06T 3/0018 |
| 2017/0124770 A1* | 5/2017 | Vats | G06F 3/011 |
| 2017/0169540 A1* | 6/2017 | Satori | H04N 21/278 |
| 2017/0171592 A1 | 6/2017 | Cui | |
| 2017/0180635 A1* | 6/2017 | Hayashi | H04N 5/23203 |
| 2017/0186219 A1* | 6/2017 | Xu | G06T 15/04 |
| 2017/0195615 A1* | 7/2017 | Han | G06F 3/04883 |
| 2017/0199715 A1* | 7/2017 | Manchinasetti | G06F 3/0346 |
| 2017/0223268 A1* | 8/2017 | Shimmoto | H04N 5/23238 |
| 2017/0244775 A1* | 8/2017 | Ha | G06T 1/20 |
| 2017/0249919 A1* | 8/2017 | Bae | H04N 21/4858 |
| 2017/0257576 A1* | 9/2017 | Mitsui | H04N 5/272 |
| 2017/0269895 A1* | 9/2017 | Gates | G06F 3/1454 |
| 2017/0270634 A1* | 9/2017 | Eggebrecht | H04N 13/189 |
| 2017/0277281 A1* | 9/2017 | Seol | G06F 3/0346 |
| 2017/0277902 A1* | 9/2017 | Bae | G06F 3/1454 |
| 2017/0287321 A1* | 10/2017 | Ann | G08C 17/02 |
| 2017/0302714 A1* | 10/2017 | Ramsay | G06F 3/0482 |
| 2017/0316611 A1* | 11/2017 | SanGiovanni | G06F 3/012 |
| 2017/0322635 A1* | 11/2017 | Yoon | H04N 21/4728 |
| 2017/0323422 A1* | 11/2017 | Kim | G06T 3/0062 |
| 2017/0336705 A1* | 11/2017 | Zhou | G06T 3/0062 |
| 2018/0005449 A1* | 1/2018 | Wallner | G06T 19/006 |
| 2018/0007387 A1* | 1/2018 | Izumi | H04N 19/132 |
| 2018/0011671 A1* | 1/2018 | Yamaguchi | G06Q 30/02 |
| 2018/0011673 A1* | 1/2018 | Kim | G06F 3/0482 |
| 2018/0025467 A1* | 1/2018 | Macmillan | H04N 13/282 382/190 |
| 2018/0027181 A1* | 1/2018 | Roulet | G06T 5/002 348/38 |
| 2018/0035105 A1* | 2/2018 | Choi | G09G 5/14 |
| 2018/0048886 A1* | 2/2018 | Yoon | H04N 21/816 |
| 2018/0052576 A1* | 2/2018 | Lee | G06F 3/0485 |
| 2018/0053280 A1* | 2/2018 | Kim | H04N 5/4403 |
| 2018/0054611 A1* | 2/2018 | Shin | G06F 1/163 |
| 2018/0054612 A1* | 2/2018 | Kim | G09G 5/003 |
| 2018/0061002 A1* | 3/2018 | Lee | H04N 19/88 |
| 2018/0061118 A1* | 3/2018 | Choi | H04N 21/44008 |
| 2018/0061363 A1* | 3/2018 | Lee | G06F 3/147 |
| 2018/0063461 A1* | 3/2018 | Kim | H04N 5/23238 |
| 2018/0070011 A1* | 3/2018 | Seo | H04N 5/4403 |
| 2018/0070043 A1* | 3/2018 | Kim | G06F 3/04845 |
| 2018/0070122 A1* | 3/2018 | Baek | G09G 5/003 |
| 2018/0075604 A1* | 3/2018 | Kim | G06T 7/10 |
| 2018/0075635 A1* | 3/2018 | Choi | H04N 13/204 |
| 2018/0077210 A1* | 3/2018 | Hannuksela | H04L 65/4092 |
| 2018/0095650 A1* | 4/2018 | Park | G06F 3/04845 |
| 2018/0101931 A1* | 4/2018 | Abbas | G06T 3/005 |
| 2018/0103195 A1* | 4/2018 | Kim | H04N 13/296 |
| 2018/0103199 A1* | 4/2018 | Hendry | H04N 21/2343 |
| 2018/0109729 A1* | 4/2018 | Jang | G06T 7/20 |
| 2018/0114348 A1* | 4/2018 | Lu | G06T 11/60 |
| 2018/0121064 A1* | 5/2018 | Lee | H04N 5/23238 |
| 2018/0124314 A1* | 5/2018 | Baek | H04N 5/23238 |
| 2018/0130243 A1* | 5/2018 | Kim | G06T 11/60 |
| 2018/0139565 A1* | 5/2018 | Norris | H04S 7/304 |
| 2018/0144488 A1* | 5/2018 | Kim | G06T 7/30 |
| 2018/0146138 A1* | 5/2018 | Jeon | G06T 3/4038 |
| 2018/0150989 A1* | 5/2018 | Mitsui | G06F 3/04815 |
| 2018/0152636 A1* | 5/2018 | Yim | H04N 5/23293 |
| 2018/0152663 A1* | 5/2018 | Wozniak | H04N 19/136 |
| 2018/0152682 A1* | 5/2018 | Wozniak | H04N 19/44 |
| 2018/0158171 A1* | 6/2018 | Kim | H04N 21/4728 |
| 2018/0160160 A1* | 6/2018 | Swaminathan | H04N 21/2662 |
| 2018/0164593 A1* | 6/2018 | Van Der Auwera | H04N 21/816 |
| 2018/0167613 A1* | 6/2018 | Hannuksela | H04N 21/23439 |
| 2018/0167634 A1* | 6/2018 | Salmimaa | H04N 19/597 |
| 2018/0173957 A1* | 6/2018 | Pavetic | G06F 16/7837 |
| 2018/0174356 A1* | 6/2018 | You | G06F 3/0482 |
| 2018/0174619 A1* | 6/2018 | Roy | G11B 27/102 |
| 2018/0176536 A1* | 6/2018 | Jo | H04N 13/366 |
| 2018/0184000 A1* | 6/2018 | Lee | G11B 27/102 |

(56) References Cited

U.S. PATENT DOCUMENTS

| | | | |
|---|---|---|---|
| 2018/0188723 A1* | 7/2018 | Lee | G05D 1/0038 |
| 2018/0192001 A1* | 7/2018 | Boyce | H04N 19/597 |
| 2018/0199001 A1* | 7/2018 | Lim | H04N 21/4104 |
| 2018/0199024 A1* | 7/2018 | Yip | H04N 13/178 |
| 2018/0199029 A1* | 7/2018 | Van Der Auwera | H04N 13/161 |
| 2018/0199042 A1* | 7/2018 | Wang | H04N 21/44008 |
| 2018/0205934 A1* | 7/2018 | Abbas | H04N 19/40 |
| 2018/0205983 A1* | 7/2018 | Lee | G06F 3/1454 |
| 2018/0227457 A1* | 8/2018 | Morita | H04N 5/77 |
| 2018/0234669 A1* | 8/2018 | Chen | G06F 3/012 |
| 2018/0241943 A1* | 8/2018 | Lee | H04N 5/23293 |
| 2018/0242017 A1* | 8/2018 | Van Leuven | H04N 19/597 |
| 2018/0249163 A1* | 8/2018 | Curcio | H04N 19/597 |
| 2018/0270417 A1* | 9/2018 | Suitoh | H04N 5/23238 |
| 2018/0286109 A1* | 10/2018 | Woo | G06T 15/205 |
| 2018/0302661 A1* | 10/2018 | Ahn | G06F 3/0482 |
| 2018/0307352 A1* | 10/2018 | Stimm | G06F 3/048 |
| 2018/0307398 A1* | 10/2018 | Kim | G06N 3/063 |
| 2018/0308281 A1* | 10/2018 | Okoyama | G06T 19/00 |
| 2018/0315244 A1* | 11/2018 | Thompson | H04N 5/23293 |
| 2018/0322611 A1* | 11/2018 | Bang | G06T 3/0037 |
| 2018/0332226 A1* | 11/2018 | Wissenbach | H04N 5/23267 |
| 2018/0332265 A1* | 11/2018 | Hwang | H04N 13/183 |
| 2018/0332267 A1* | 11/2018 | Hesla | H04N 5/9201 |
| 2018/0338160 A1* | 11/2018 | Lee | H04N 19/597 |
| 2018/0343388 A1* | 11/2018 | Matsushita | H04N 5/23238 |
| 2018/0356942 A1* | 12/2018 | Zilse Pereira Borges | G06F 3/0481 |
| 2018/0359462 A1* | 12/2018 | Shinohara | G06F 3/01 |
| 2018/0364881 A1* | 12/2018 | Lee | G06F 3/1454 |
| 2018/0374192 A1* | 12/2018 | Kunkel | G06T 15/205 |
| 2018/0376126 A1* | 12/2018 | Hannuksela | H04N 19/30 |
| 2019/0014304 A1* | 1/2019 | Curcio | H04L 65/607 |
| 2019/0014373 A1* | 1/2019 | Shin | H04N 21/436 |
| 2019/0026005 A1* | 1/2019 | Lee | G06T 15/20 |
| 2019/0045222 A1* | 2/2019 | Yip | H04N 19/124 |
| 2019/0052858 A1* | 2/2019 | Yip | H04N 5/23238 |
| 2019/0058862 A1* | 2/2019 | Kim | H04N 13/117 |
| 2019/0087147 A1* | 3/2019 | Nah | H04M 1/72555 |
| 2019/0096275 A1* | 3/2019 | Chu | G06F 3/04845 |
| 2019/0108611 A1* | 4/2019 | Izumi | G06T 3/0062 |
| 2019/0132569 A1* | 5/2019 | Karpenko | G06F 3/0488 |
| 2019/0174116 A1* | 6/2019 | Oh | H04N 13/00 |
| 2019/0197666 A1* | 6/2019 | Oikkonen | G06T 3/0062 |
| 2019/0199921 A1* | 6/2019 | Oh | H04N 19/46 |
| 2019/0205008 A1* | 7/2019 | Anker | H04N 21/4126 |
| 2019/0206013 A1* | 7/2019 | Okuyama | H04N 5/232 |
| 2019/0220952 A1* | 7/2019 | Lee | G06T 3/4038 |
| 2019/0221019 A1* | 7/2019 | Itoi | G06F 3/147 |
| 2019/0230377 A1* | 7/2019 | Ma | H04N 19/176 |
| 2019/0235748 A1* | 8/2019 | Seol | G06F 3/0484 |
| 2019/0236400 A1* | 8/2019 | Fu | G06K 9/6202 |
| 2019/0236990 A1* | 8/2019 | Song | G06T 3/0062 |
| 2019/0238612 A1* | 8/2019 | Xie | G06T 3/4038 |
| 2019/0238888 A1* | 8/2019 | Kim | H04N 19/513 |
| 2019/0244435 A1* | 8/2019 | Grenfell | G06T 15/20 |
| 2019/0246104 A1* | 8/2019 | Liu | H04N 19/597 |
| 2019/0268599 A1* | 8/2019 | Hannuksela | G03B 37/00 |
| 2019/0281217 A1* | 9/2019 | Kim | H04N 19/119 |
| 2019/0281273 A1* | 9/2019 | Lin | H04N 19/167 |
| 2019/0281293 A1* | 9/2019 | Lin | H04N 19/14 |
| 2019/0286318 A1* | 9/2019 | Lee | H04N 5/23238 |
| 2019/0297350 A1* | 9/2019 | Lin | H04N 19/176 |
| 2019/0306435 A1* | 10/2019 | Park | G09G 5/006 |
| 2019/0311459 A1* | 10/2019 | Zhu | G06T 3/0062 |
| 2019/0311697 A1* | 10/2019 | Kim | H04N 5/44591 |
| 2019/0313081 A1* | 10/2019 | Oh | H04N 13/178 |
| 2019/0320156 A1* | 10/2019 | Oh | H04N 19/46 |
| 2019/0325558 A1* | 10/2019 | Ohba | G06F 3/04815 |
| 2019/0325652 A1* | 10/2019 | Di | G06T 19/00 |
| 2019/0333479 A1* | 10/2019 | Maalouf | G09G 5/14 |
| 2019/0335203 A1* | 10/2019 | Li | H04N 19/105 |
| 2019/0347760 A1* | 11/2019 | Takahashi | H04N 21/234345 |
| 2019/0364261 A1* | 11/2019 | Hwang | H04N 13/178 |
| 2019/0373245 A1* | 12/2019 | Lee | H04N 21/26258 |
| 2019/0379856 A1* | 12/2019 | Hur | G06F 16/583 |
| 2019/0379876 A1* | 12/2019 | Hur | H04N 13/178 |
| 2019/0379877 A1* | 12/2019 | Oh | H04N 21/235 |
| 2019/0379884 A1* | 12/2019 | Oh | H04N 19/46 |
| 2019/0387212 A1* | 12/2019 | Oh | H04N 13/194 |
| 2020/0014905 A1* | 1/2020 | Oh | H04N 21/816 |
| 2020/0014907 A1* | 1/2020 | Lee | H04N 13/178 |
| 2020/0021791 A1* | 1/2020 | Hur | H04N 21/4728 |
| 2020/0036952 A1* | 1/2020 | Iwane | H04N 13/156 |
| 2020/0045244 A1* | 2/2020 | Ohmura | H04N 7/15 |
| 2020/0045323 A1* | 2/2020 | Hannuksela | H04N 21/23439 |
| 2020/0074587 A1* | 3/2020 | Lee | G06T 3/005 |
| 2020/0074593 A1* | 3/2020 | Wang | H04N 19/182 |
| 2020/0077021 A1* | 3/2020 | Ihara | H04N 5/93 |
| 2020/0077070 A1* | 3/2020 | Takahashi | H04N 13/349 |
| 2020/0084428 A1* | 3/2020 | Oh | H04N 21/2343 |
| 2020/0092471 A1* | 3/2020 | Wang | H04N 13/106 |
| 2020/0092531 A1* | 3/2020 | Di | H04N 21/2662 |
| 2020/0107008 A1* | 4/2020 | Hur | H04N 13/282 |
| 2020/0107009 A1* | 4/2020 | Hwang | H04N 13/156 |
| 2020/0120274 A1* | 4/2020 | Wang | G06T 3/0062 |
| 2020/0137418 A1* | 4/2020 | Onno | H04N 19/563 |
| 2020/0153885 A1* | 5/2020 | Lee | G06T 19/006 |
| 2020/0154138 A1* | 5/2020 | Song | H04N 19/115 |
| 2020/0162871 A1* | 5/2020 | Ko | H04W 8/22 |

FOREIGN PATENT DOCUMENTS

| | | |
|---|---|---|
| CN | 103339927 A | 10/2013 |
| CN | 102510474 B | 12/2013 |
| CN | 103634634 A | 3/2014 |
| CN | 105208368 A | 12/2015 |
| CN | 105898271 A | 8/2016 |
| CN | 105898460 A | 8/2016 |
| CN | 105913478 A | 8/2016 |
| CN | 106028115 A | 10/2016 |
| CN | 106060570 A | 10/2016 |
| EP | 1 441 307 A1 | 7/2004 |
| EP | 2 518 686 A1 | 10/2012 |
| EP | 2 682 859 A2 | 1/2014 |
| EP | 3 242 267 A1 | 11/2017 |
| KR | 101251964 B1 | 4/2013 |
| KR | 101354899 B1 | 1/2014 |
| KR | 1020150025167 A | 3/2015 |
| WO | 2012/071435 A1 | 5/2012 |
| WO | 2015/163529 A1 | 10/2015 |
| WO | 2018/030829 A1 | 2/2018 |

OTHER PUBLICATIONS

Communication dated Apr. 11, 2018 by the European Patent Office in counterpart European Patent Application No. 17198707.6.
Communication dated Mar. 28, 2018 issued by the International Searching Authority in counterpart International Patent Application No. PCT/KR2017/011870 (PCT/ISA/220, PCT/ISA/210 & PCT/ISA/237).
Communication dated Apr. 11, 2018 issued by the European Patent Office in counterpart European Patent Application No. 17198706.8.
Communication dated Oct. 25, 2019, issued by the State Intellectual Property Office of P.R. China in counterpart Chinese Application No. 201711027682.5.
Communication dated Sep. 26, 2019, issued by the State Intellectual Property Office of P.R. China in counterpart Chinese Application No. 201711022566.4.
Communication dated May 11, 2020 issued by the European Intellectual Property Office in counterpart European Application No. 17 198 707.6.
Communication dated Jul. 6, 2020 issued by the State Intellectual Property Office of P.R. China in counterpart Chinese Application No. 201711022566.4.
"Chromecast—Wikipedia", Wikipedia, Oct. 25, 2016, pp. 1-15, 15 pages total, XP055689379, https://en.wikipedia.org/w/index.php?title.Chromecast&oldid=746088852.

* cited by examiner

IMAGE DISPLAY APPARATUS, MOBILE DEVICE, AND METHODS OF OPERATING THE SAME

CROSS-REFERENCE TO RELATED APPLICATION

This application claims priority from Korean Patent Application No. 10-2016-0142155, filed on Oct. 28, 2016 in the Korean Intellectual Property Office, the disclosure of which is incorporated herein by reference in its entirety.

BACKGROUND

1. Field

Methods and apparatuses consistent with exemplary embodiments relate to an image display apparatus, a mobile device, and methods of operating the image display apparatus and the mobile device.

2. Related Art

An image display apparatus displays an image which a user can view. The user may view various images or videos, such as a broadcast program, through the image display apparatus.

Smart televisions (TVs) for providing additional functionality have recently been developed.

A 360-degree image refers to an image which includes views in all directions. For example, a 360-degree image may be captured using an omni-directional camera or a set of cameras.

SUMMARY

One or more exemplary embodiments provide an image display apparatus, a mobile device, and methods of operating the image display apparatus and the mobile device whereby a 360-degree image may be conveniently and effectively controlled.

Additional aspects will be set forth in part in the description which follows and, in part, will be apparent from the description, or may be learned by practice of exemplary embodiments.

According to an aspect of an exemplary embodiment, there is provided a mobile device including: a communication interface; a display; a memory configured to store one or more instructions; and at least one processor configured to execute the one or more instructions stored in the memory to: control the communication interface to communicate with an image display apparatus; control a viewpoint of a 360-degree image based on an input; and control the communication interface to transmit, to the image display apparatus, at least one among an image corresponding to the viewpoint of the 360-degree image, and viewpoint control information corresponding to the viewpoint of the 360-degree image.

The at least one processor may be further configured to execute the one or more instructions stored in the memory to generate a sphere-type 360-degree image based on the 360-degree image.

The at least one processor may be further configured to execute the one or more instructions stored in the memory to control the communication interface to receive the 360-degree image from the connected image display apparatus.

The at least one processor may be further configured to execute the one or more instructions stored in the memory to determine the viewpoint of the 360-degree image by rotating the 360-degree image input or magnifying the 360-degree image based on the input.

The at least one processor may be further configured to execute the one or more instructions stored in the memory to determine the image corresponding to the viewpoint based on the input.

The at least one processor may be further configured to execute the one or more instructions stored in the memory to generate a sphere-type 360-degree image based on the 360-degree image and control the communication interface to transmit, to the image display apparatus, the sphere-type 360 degree image.

The at least one processor may be further configured to execute the one or more instructions stored in the memory to determine the image corresponding to the viewpoint based on at least one among information about the 360-degree image and information about the image display apparatus.

The at least one processor may be further configured to execute the one or more instructions stored in the memory to process the image corresponding to the viewpoint based on an aspect ratio of the image display apparatus.

The at least one processor may be further configured to execute the one or more instructions stored in the memory to control the communication interface to exchange information regarding the 360-degree image for screen mirroring, generate one or more tasks for the screen mirroring, and allocate each of the one or more tasks to one among the mobile device and the image display apparatus based on processing resources of the mobile device and the image display apparatus.

According to an aspect of another exemplary embodiment, there is provided an image display apparatus including: a communication interface; a display; a memory configured to store one or more instructions; and at least one processor configured to execute the one or more instructions stored in the memory to: control the communication interface to communicate with a mobile device, control the communication interface to receive a 360-degree image from the mobile device or transmit the 360-degree image to the mobile device, and control the display to display an image corresponding to a selected viewpoint of the 360-degree image.

The at least one processor may be further configured to execute the one or more instructions stored in the memory to: control the communication interface to receive, from the mobile device, at least one among viewpoint control information corresponding to a viewpoint based on an input and an image of an area of the 360-degree image corresponding to the viewpoint according to the input, and determine the selected viewpoint of the 360-degree image based on at least one among the viewpoint control information and the image of the area of the 360-degree image corresponding to the viewpoint.

The viewpoint control information may include at least one among an angle of view of the 360-degree image and a zooming degree of the 360-degree image.

The image corresponding to the selected viewpoint may correspond to at least one among information about the 360-degree image and information about the image display apparatus According to an aspect of yet another exemplary embodiment, there is provided a method of operating a mobile device, the method including: controlling a communication interface of the mobile device to communicate with an image display apparatus concerning a 360-degree image; displaying, on a display of the mobile device, a 360-degree image; controlling a viewpoint of the 360-degree image based on an input; and transmitting, to the image display apparatus, at least one among an image corresponding to the viewpoint of the 360-degree image and viewpoint control information corresponding to the viewpoint of the 360-degree image.

The may further include receiving the 360-degree image from the image display apparatus.

The method may further include at least one among rotating the 360-degree image and magnifying the 360-degree image according to the input.

The method may further include generating a sphere-type 360-degree image based on the 360-degree image; and determining the image corresponding to the viewpoint according to the input and the sphere-type 360-degree image.

The method may further include transmitting, to the image display apparatus, viewpoint control information corresponding to the sphere-type 360-degree image.

According to an aspect of yet another exemplary embodiment, there is provided a method of operating an image display apparatus, the method including: controlling a communication interface of the image display apparatus to connect to a mobile device; receiving a 360-degree image from the mobile device, or transmitting the 360-degree image to the mobile device; and controlling the image display apparatus to display an image corresponding to a viewpoint of the 360-degree image.

The method may further include: receiving, from the mobile device, at least one among viewpoint control information generated based on an input controlling the viewpoint of the 360-degree image displayed on the mobile device and an image of an area in the 360-degree image corresponding to the viewpoint; and displaying the image corresponding to the viewpoint of the 360-degree image based on the at least one among the viewpoint control information and the image of the area of the 360-degree image corresponding to the viewpoint.

According to an aspect of still yet another exemplary embodiment, there is provided an image display apparatus including: a communication interface;

a display; a memory configured to store one or more instructions; and at least one processor configured to execute the one or more instructions stored in the memory to: control the display to display an a 360-degree image, control the communication interface to receive a control signal from an external apparatus, control the display to display a section of the 360-degree image based on the control signal.

The display may include a touchscreen configured to generate a touch input signal, and the at least one processor may be further configured to execute the one or more instructions stored in the memory to control the display to display a section of the 360-degree image based on the touch input signal and the control signal.

The at least one processor may be further configured to execute the one or more instructions stored in the memory to display a 3D indicator indicating a position of the section of the 360-degree image.

The at least one processor may be further configured to execute the one or more instructions stored in the memory to: determine one among the image display apparatus and the external apparatus based one resources of the image display apparatus and resources of the external apparatus, control the determined one among the image display apparatus and the external apparatus to generate a sphere-type 360 degree image based on the 360-degree image, and communicate the sphere-type 360 degree image between the image display apparatus and the external apparatus.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
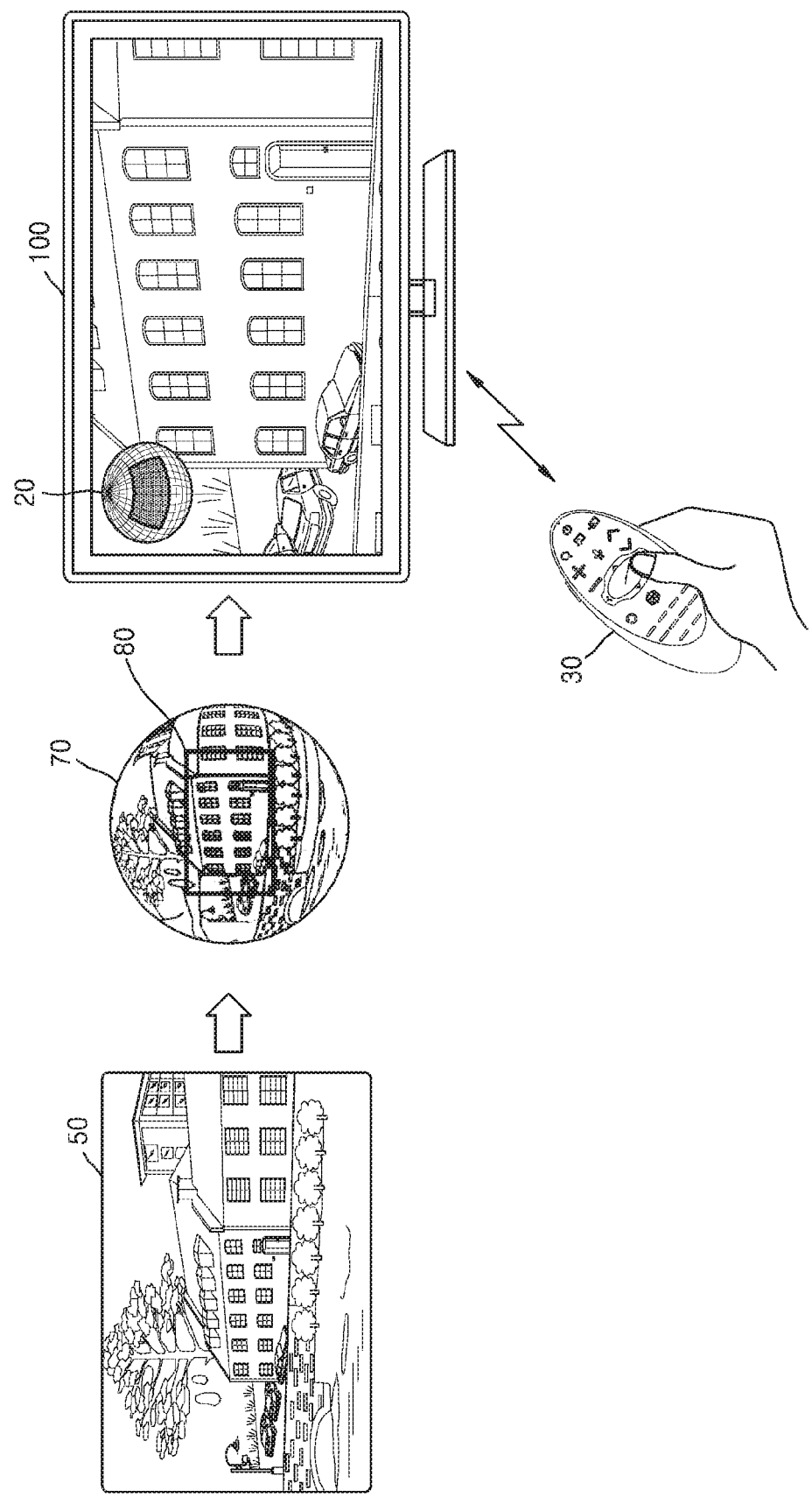
FIG. 1 is a diagram illustrating an image display apparatus displaying a 360-degree image, and a control device, according to an exemplary embodiment.

Hereinafter, terms that are used in the specification will be briefly described, and the present disclosure will be described in detail.

All terms including descriptive or technical terms which are used herein should be construed as having their ordinary meanings. However, it will be appreciated specific terms may have different meanings according to an intention of one of ordinary skill in the art, precedent cases, or the appearance of new technologies. Also, some terms may be arbitrarily selected by the applicant, and in this case, the meaning of the selected terms will be described in detail herein. Thus, the terms used herein are to be understood based on the ordinary meaning together with the description throughout the specification.

Throughout the specification, when a part "includes" or "comprises" an element, unless there is a particular description contrary thereto, the part can further include other elements. In the following description, terms such as "unit" and "module" indicate a unit for processing at least one function or operation, wherein the unit and the block may be embodied as hardware or software or embodied by combining hardware and software.

Reference will now be made in detail to exemplary embodiments, aspects of which are illustrated in the accompanying drawings. The present disclosure may, however, be embodied in many different forms, and should not be construed as being limited to the exemplary embodiments set forth herein; rather, these exemplary embodiments are provided so that this disclosure will be thorough and complete, and will fully convey the concept to one of ordinary skill in the art. In the drawings, for a more clear description, parts or units may be omitted. Also, throughout the specification, like reference numerals in the drawings denote like elements.

Expressions such as "at least one of," when preceding a list of elements, modify the entire list of elements and do not modify the individual elements of the list.

In the description of exemplary embodiments, the term "user" may refer to a person who controls a function or an operation of an image display apparatus by using a control device, and may include a viewer, a manager, or an installation engineer.

FIG. 1 is a diagram illustrating an image display apparatus 100 displaying a 360-degree image, and a control device, according to an exemplary embodiment.

Referring to FIG. 1, the image display apparatus 100 may display a 360-degree image. The 360-degree image may indicate an image having an angle of view that is 360 degrees. The 360-degree image may be a still image, a moving picture, or a panorama image. For example, the 360-degree image may be an image generated based on a plurality of images captured in 360-degree directions by using at least one camera. In this regard, the plurality of captured images may be mapped to a sphere, and contacts of the mapped images may be stitched together to generate a sphere-type 360-degree image 70. In addition, the sphere-type 360-degree image 70 may be converted to a plane-type 360-degree image 50, as shown in FIG. 1, so that the plane-type 360-degree image 50 may be transmitted to another device or stored.

The image display apparatus 100 may perform graphics processing on the plane-type 360-degree image 50, thereby converting the plane-type 360-degree image 50 to the sphere-type 360-degree image 70. The image display apparatus 100 may select an area 80 of the sphere-type 360-degree image 70, the area 80 corresponding to a certain angle of view, and may display an image corresponding to the selected area 80 on a display. In this regard, the image display apparatus 100 may scale the image corresponding to the selected area 80 according to a resolution of the display and then may display the image. In addition, the image display apparatus 100 may display a three-dimensional (3D) indicator 20 indicating a position of the area 80 in the 360-degree image. Detailed descriptions with respect to an angle of view of the 360-degree image will be provided below with reference to FIG. 2.

The image display apparatus 100 may be a television (TV), but this is exemplary, and the image display apparatus 100 may be embodied as any electronic apparatus including a display. For example, the image display apparatus 100 may be embodied as a mobile phone, a tablet personal computer (PC), a digital camera, a camcorder, a laptop computer, a desktop PC, an electronic book (e-book) terminal, a terminal for digital broadcasting, a personal digital assistant (PDA), a portable multimedia player (PMP), a navigation machine, an MP3 player, a wearable device, or the like. In particular, exemplary embodiments may be readily implemented in display apparatuses having a large display, such as a TV, but are not limited thereto. In addition, the image display apparatus 100 may be a stationary-type image display apparatus or mobile-type image display apparatus, and may be a digital broadcasting receiver capable of receiving a digital broadcast signal.

The image display apparatus 100 may be embodied as not only a flat display apparatus, but also embodied as a curved display apparatus having a curvature or a flexible display apparatus of which curvature is adjustable. Examples of an output resolution of the image display apparatus 100 may include high definition (HD), full HD, ultra HD, and other resolutions higher than ultra HD.

The image display apparatus 100 may be controlled by a control device 30. The control device 30 may be embodied as one of various devices including a remote controller, a mobile phone, or the like, capable of controlling the image display apparatus 100.

The control device 30 may control the image display apparatus 100 by using short-range communication, such as infrared communication or Bluetooth communication. The control device 30 may control at least one function of the image display apparatus 100 based on a user input, which may be input via keys (including buttons), a touchpad, a microphone capable of receiving a user voice, a sensor capable of recognizing a motion of the control device 30, or any other input device.

The control device 30 include four-direction keys (or four-direction buttons). The four-direction keys may be used to move the position of the area 80 of the 360-degree image which is displayed on the display.

The control device 30 may be a pointing device. For example, when the control device 30 receives a particular key input, the control device 30 may operate as the pointing device. When the control device 30 operates as the pointing device, the image display apparatus 100 may be controlled according to a user input of moving the control device 30 in up, down, right or left directions, or tilting the control device 30. Information about a motion of the control device 30 which is sensed by the sensor of the control device 30 may be transmitted to the image display apparatus 100. Based on the information about the motion of the control device 30, the image display apparatus 100 may change the area 80 of the 360-degree image which is displayed on the display.

Alternatively, if the control device 30 includes a touchpad, the image display apparatus 100 may move the position of the area 80 of the 360-degree image which is displayed on the display according to a displacement value of an object, such as a finger of a user, which moves on or near the touchpad.

Figure 2:
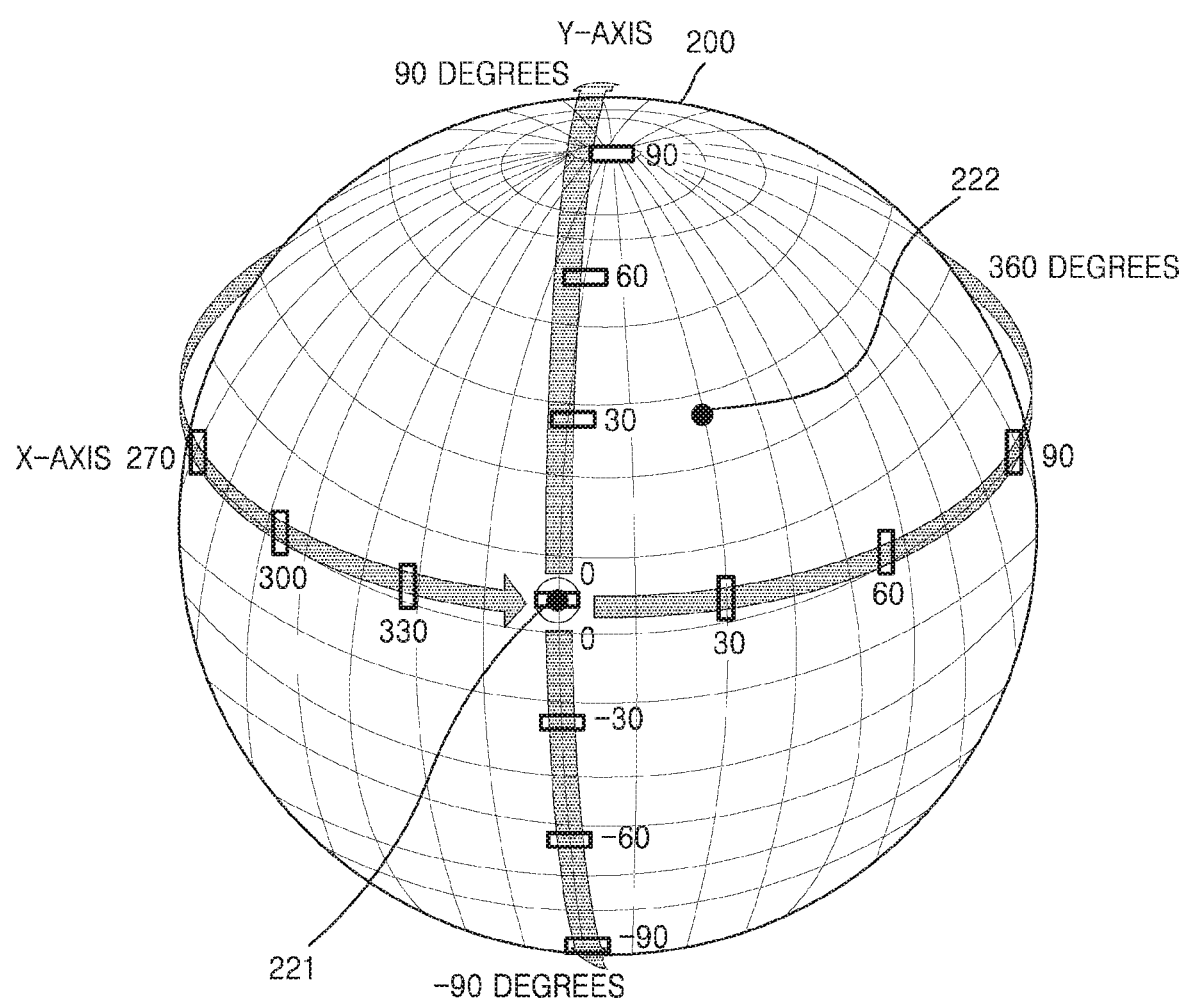
FIG. 2 is a diagram for describing an angle of view of a 360-degree image according to an exemplary embodiment.

FIG. 2 is a diagram for describing an angle of view of a 360-degree image.

As described above, the 360-degree image may be an image generated based on a plurality of images captured in 360-degree directions by using at least one camera. In this regard, the plurality of captured images may be mapped to a sphere, and contacts of the mapped images may be stitched together to generate a sphere-type 360-degree image.

In addition, the 360-degree image may refer to an image having an angle of view that is 360 degrees. When the 360-degree image is represented as a sphere-type image 200, the angle of view of the 360-degree image may include x-axis coordinates and y-axis coordinates. The x-axis coordinates may indicate angles formed when a vertical plane crossing the center of the sphere rotates along a surface of the sphere. The y-axis coordinates may indicate angles formed when a horizontal plane crossing the center of the sphere rotates along the surface of the sphere. For example, the x-axis coordinates may have a range of 0 degrees to 360 degrees, and the y-axis coordinates may have a range of −90 degrees to 90 degrees or 0 degree to 180 degrees.

For example, referring to FIG. 2, when an angle of view (x, y) of a predetermined point 221 located at the spherical surface of the sphere-type image 200 is set to be (0 degrees, 0 degrees), an angle of view of a point 222 may be (30 degrees, 30 degrees).

Figure 3:
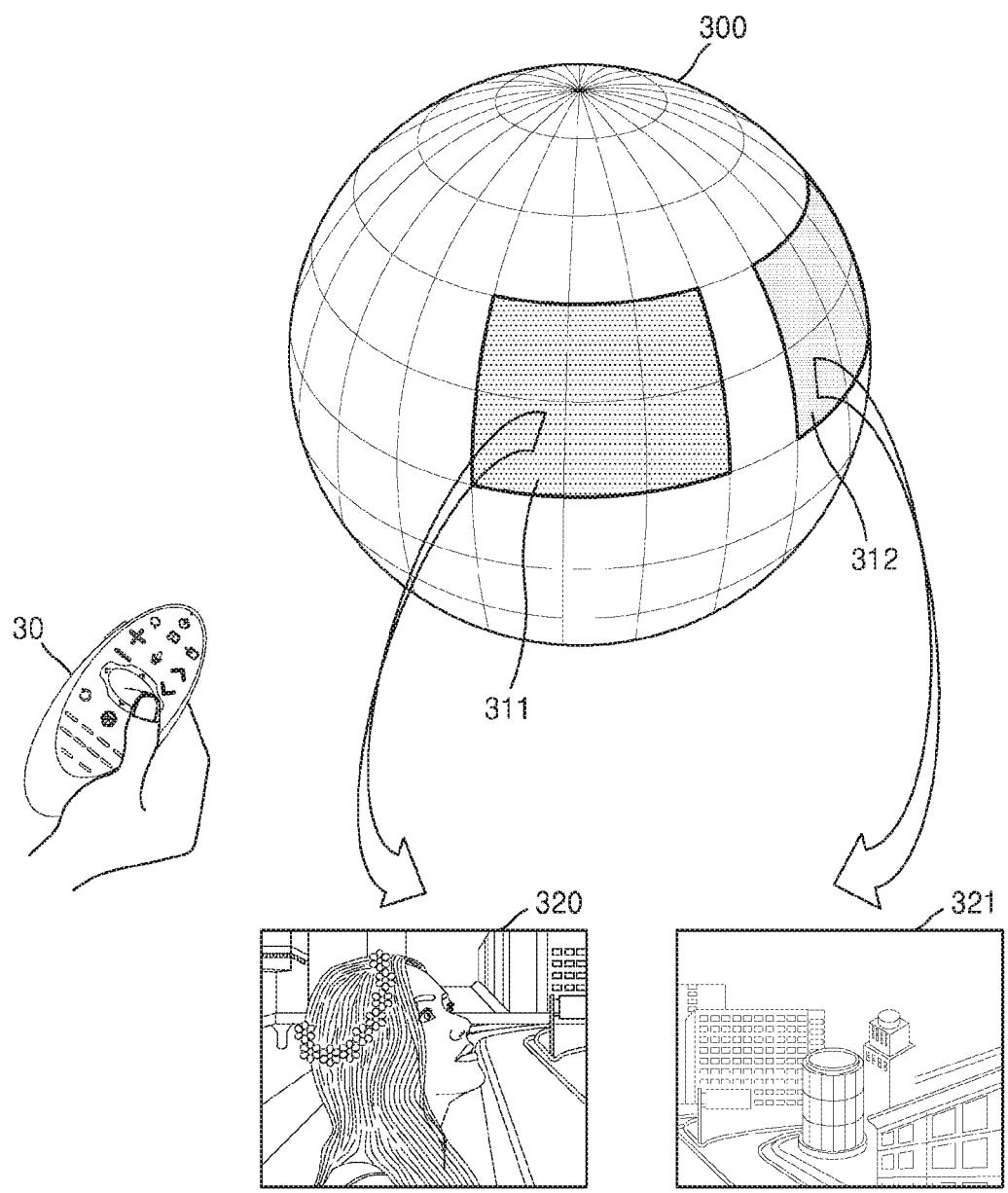
FIG. 3 is a diagram for describing a method of displaying a 360-degree image, according to an exemplary embodiment.

FIG. 3 is a diagram with respect to a method of displaying a 360-degree image, according to an exemplary embodiment.

A user may navigate the 360-degree image 300 so as to view an image of the 360-degree image, the image corresponding to a desired angle. Referring to FIG. 3, when the user views an image 320 corresponding to an area 311 of which angle of view is 0 degree, if the user wants to view an image of an area in the right, the user may select a user input of adjusting an angle of view by using the control device 30. For example, if the user selects a user input of changing an angle of view to 60 degrees, the image display apparatus 100 may display an image 321 corresponding to an area 312 of which angle of view is 60 degrees.

According to an exemplary embodiment, the user may control the angle of view of the 360-degree image by using the four-direction keys of the control device 30. For example, the user may horizontally navigate the 360-degree image by using left and right direction keys of the four-direction keys. For example, the user may vertically navigate the 360-degree image by using up and down direction keys of the four-direction keys.

According to an exemplary embodiment, the user may adjust the angle of view of the 360-degree image by moving the control device 30 including an acceleration sensor or a gyroscope sensor in up, down, right, left directions, or other direction.

According to an exemplary embodiment, the user may adjust the angle of view of the 360-degree image according to a direction of a movement of a finger of the user while touching the touchpad arranged at the control device 30.

If the image display apparatus 100 has a touch-sensitive screen, the user may adjust the angle of view of the 360-degree image by using touch movements of the finger of the user, the finger being on the touch-sensitive screen of the image display apparatus 100.

The user may zoom in or out of the 360-degree image by using a particular key or button of the control device 30, or performing a gesture using the control device 30. In response to a zooming-in input, the image display apparatus 100 may magnify and display a currently-displayed area. In response to a zooming-out input, the image display apparatus 100 may decrease and display the currently-displayed area. According to an exemplary embodiment, if a zooming-out degree exceeds a preset threshold, the image display apparatus 100 may display a sphere-type image. For example, a zooming range may be between −4× and +4×.

Figure 4:
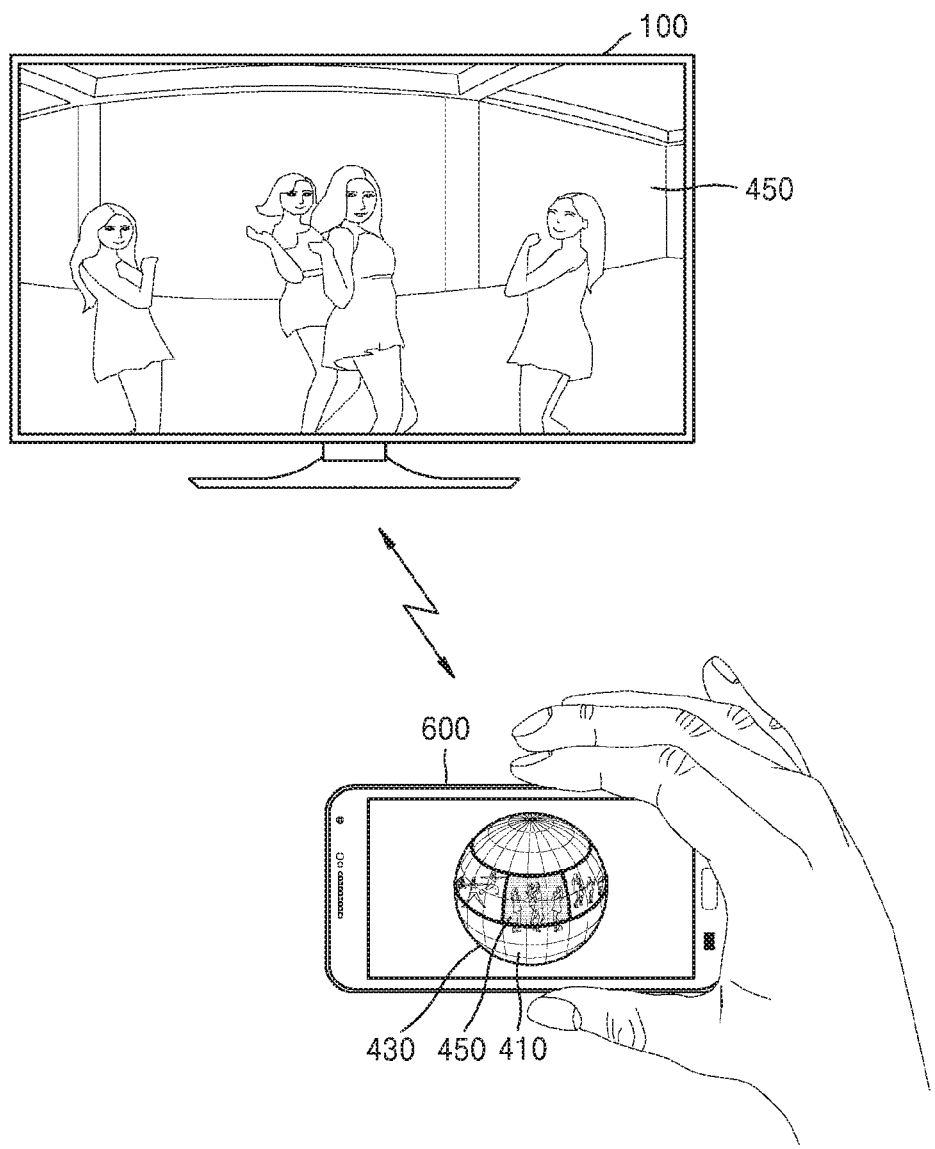
FIG. 4 is a reference diagram for describing a concept of displaying a 360-degree image by using the image display apparatus and a mobile device, according to an exemplary embodiment.

FIG. 4 is a reference diagram for describing a concept of displaying a 360-degree image by using the image display apparatus 100 and a mobile device 600, according to an exemplary embodiment.

Referring to FIG. 4, the image display apparatus 100 and the mobile device 600 may be connected by using various mirroring techniques. The various mirroring technologies may include digital living network alliance (DLNA), Bluetooth, Miracast, Wi-Fi direct, digital mobile radio (DMR), or the like. A mirroring technique involves transmitting and receiving an image displayed on a screen of one electronic apparatus so that the image can be equally displayed on a screen of another electronic apparatus. For example, an image displayed on a screen of a smartphone may be output to a screen of a smart TV, and an image displayed on the screen of the smart TV may be output to the screen of the smartphone.

The mobile device 600 may display a sphere-type 360-degree image 430 generated from an original image of a 360-degree image. The sphere-type 360-degree image 430 represents all areas of the original 360-degree image, i.e., areas of 180 degrees in left and right direction, and areas from −90 degrees to +90 degrees in up and down directions, so that the user may view areas in a large range from the sphere-type 360-degree image 430. Because the user can view the areas in the large range at one time, compared to an area of a 360-degree image which corresponds to a certain angle of view, the user may conveniently search for or select a desired-area of the 360-degree image. The user may rotate the sphere-type 360-degree image 430 by controlling a viewpoint of the sphere-type 360-degree image 430 displayed on the mobile device 600. For example, when the sphere-type 360-degree image 430 initially represents areas from −90 degrees to +90 degrees on an x-axis, if the user changes an angle of view by +30 degrees, the mobile device 600 may rotate the sphere-type 360-degree image 430 by +30 degrees, thereby displaying areas from −60 degrees to +120 degrees.

The image display apparatus 100 may display an area corresponding to a selected viewpoint in the sphere-type 360-degree image 430. The selected viewpoint may be variously determined.

The original image of the 360-degree image may be present in one of the image display apparatus 100 and the mobile device 600. The image display apparatus 100 and the mobile device 600 may exchange the 360-degree image, an image corresponding to an area of the 360-degree image, and information for controlling a viewpoint of the 360-degree image by using various mirroring techniques.

As illustrated in FIG. 4, when a 360-degree image is displayed on the image display apparatus 100 and the mobile device 600 by using a mirroring technique, the image display apparatus 100 displays a selected viewpoint image 450 corresponding to a certain area of the 360-degree image, and the mobile device 600 displays the sphere-type 360-degree image 430, so that a user may view areas in a large range from the sphere-type 360-degree image 430 displayed on the mobile device 600, and may easily control a viewpoint of the 360-degree image by using the sphere-type 360-degree image 430.

Figure 5:
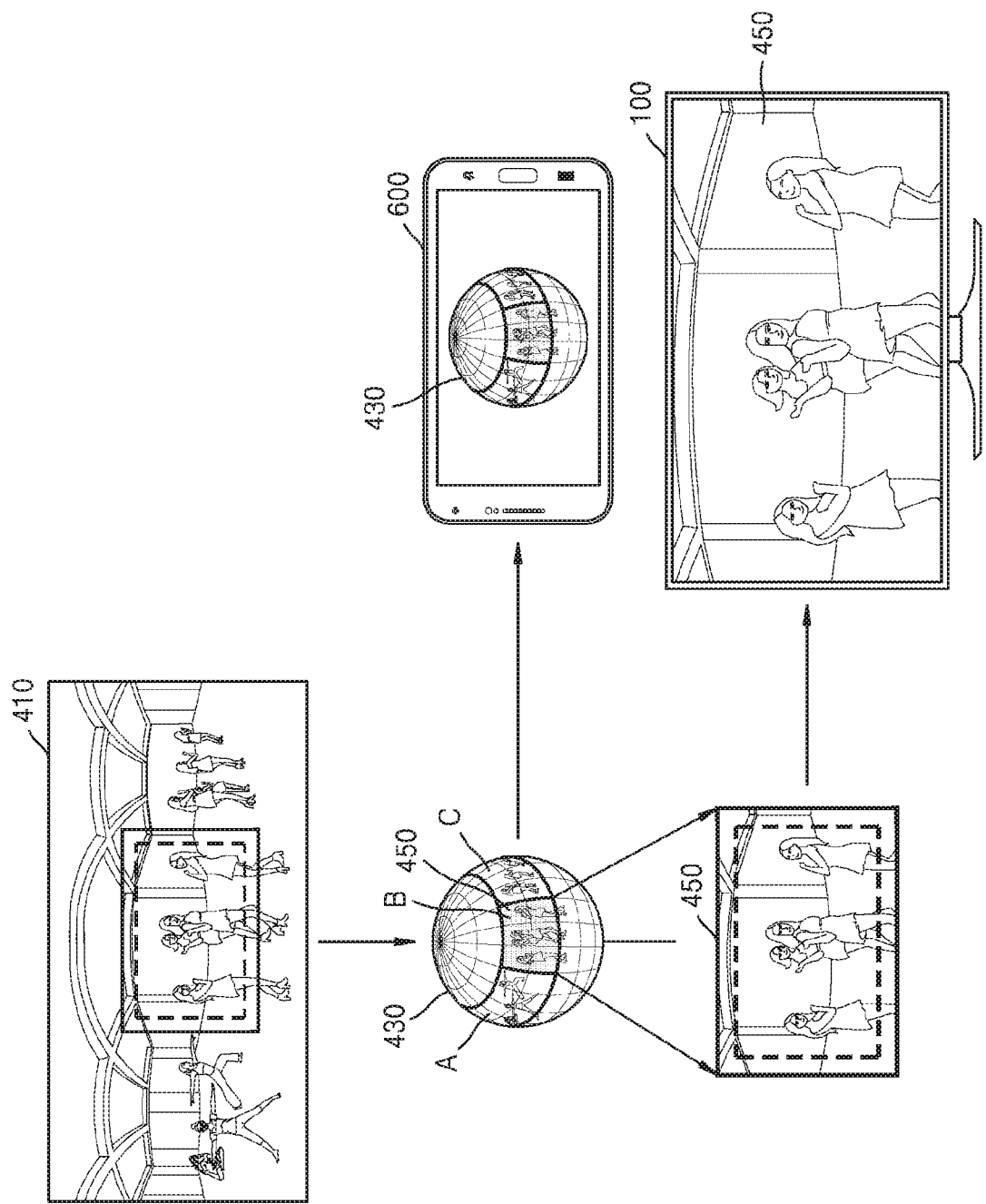
FIG. 5 is a reference diagram for describing an original image of a 360-degree image, a sphere-type 360-degree image, and a selected viewpoint image, according to an exemplary embodiment.

FIG. 5 is a reference diagram for describing an original image 410 of a 360-degree image, a sphere-type 360-degree image 430, and a selected viewpoint image 450, according to an exemplary embodiment.

Referring to FIG. 5, the original image 410 refers to a two-dimensional (2D) 360-degree image, and may be present in the image display apparatus 100 or the mobile device 600.

The sphere-type 360-degree image 430 indicates a sphere-type image generated by mapping the original image 410 of the 360-degree image to a sphere. The sphere-type 360-degree image 430 may be displayed on the mobile device 600.

The selected viewpoint image 450 indicates an image of an area B which corresponds to a selected viewpoint, the area B being from among areas A, B, and C of the sphere-type 360-degree image 430. The selected viewpoint may be variously determined. For example, the selected viewpoint may be determined as a default by the image display apparatus 100, may be determined according to information of the 360-degree image, or may be determined according to a user input of controlling the sphere-type 360-degree image 430 displayed on the mobile device 600. The selected viewpoint image 450 may be displayed on the image display apparatus 100.

Large amounts of graphical processing resources may be required to map the original image 410 to the sphere-type 360-degree image 430 or to perform processing so as to project the selected viewpoint image 450 from the sphere-type 360-degree image 430. Thus, it is possible to determine which one of the image display apparatus 100 and the mobile device 600 is to perform the mapping processing or the projection processing, in consideration of a processing resource function between the image display apparatus 100 and the mobile device 600 that are connected in a mirroring manner.

Figure 6:
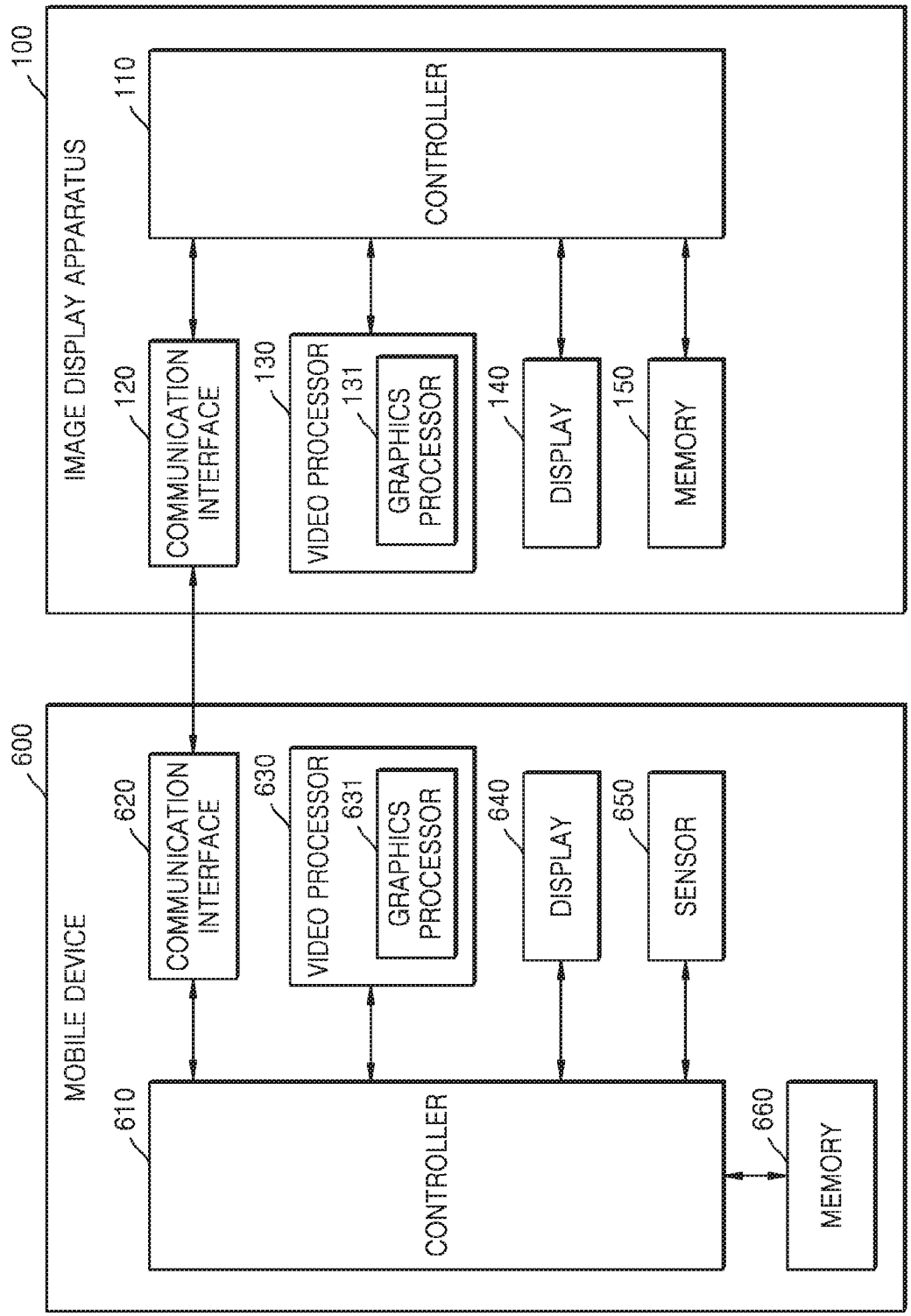
FIG. 6 illustrates block diagrams of the image display apparatus and the mobile device, according to an exemplary embodiment.

FIG. 6 illustrates block diagrams of the image display apparatus 100 and the mobile device 600, according to an exemplary embodiment.

Referring to FIG. 6, the mobile device 600 includes a controller 610, a communication interface 620, a video processor 630, a display 640, a sensor 650, and a memory 660.

The communication interface 620 allows the mobile device 600 to communicate with the image display apparatus 100 by using various mirroring techniques including screen mirroring, DLNA, Bluetooth, Miracast, Wi-Fi direct, or the like.

The video processor 630 may perform signal processing on an image to be displayed by the display 640, and may perform various image processing such as decoding, scaling, noise filtering, frame-rate conversion, resolution conversion, etc., on video data.

In particular, a graphics processor 631 may map a 2D 360-degree image to a sphere-type 360-degree image, or may project an image of a selected viewpoint area in the sphere-type 360-degree image. If a processing resource of the graphics processor 631 of the mobile device 600 is insufficient, a graphics processor 131 of the image display apparatus 100 may perform the mapping processing or the projection processing.

The display 640 generates a driving signal by converting an image signal, a data signal, an on-screen display (OSD) signal, a control signal, etc., processed by the video processor 630. The display 640 may be embodied as a plasma display panel (PDP), a liquid crystal display (LCD), an organic light-emitting display (OLED), a flexible display, or the like, or may be embodied as a 3D display. In addition, the display 640 may be embodied as a touchscreen, thereby operating as both an output device and an input device.

The display 640 may display, by using a mirroring technique, a sphere-type 360-degree image generated from a 360-degree image to be displayed.

Also, the display 640 may rotate and display the sphere-type 360-degree image in response to a user input of controlling a viewpoint of the sphere-type 360-degree image.

The sensor 650 may sense a user input and may transmit a sensed signal to the controller 610. The sensor 650 may include a microphone to receive a user voice, a camera to receive a user image, or a light receiver or a touch pad to sense user interaction.

The sensor 650 may sense an input of moving a position of an area of the 360-degree image displayed on the display 64, i.e., a user input for controlling a viewpoint of the 360-degree image, an input of zooming in or out an image displayed on the display 64, an input for allowing an image to be displayed, the image corresponding to an area at a particular position in the 360-degree image, or the like.

The memory 660 may include an operating system (OS), at least one item of data to be processed by the controller 610, and one or more instructions to be executed by the controller 610.

In particular, the memory 660 may include one or more instructions involving controlling the communication interface 620 to exchange the 360-degree image with the image display apparatus 100 connected for mirroring, outputting a sphere-type 360-degree image generated from the 360-degree image to the display 64, controlling a viewpoint of the sphere-type 360-degree image in response to a user input of controlling the viewpoint of the displayed sphere-type 360-degree image, and transmitting, to the image display apparatus 100, at least one among the 360-degree image, a selected viewpoint image of the 360-degree image, and viewpoint control information with respect to the 360-degree image so as to display the 360-degree image on the image display apparatus 100.

In the present exemplary embodiment, the term "memory" includes a storage, a read-only memory (ROM) or random-access memory (RAM) of a controller, or a memory card (e.g., a micro secure digital (micro SD) card, a universal serial bus (USB) memory, etc.) that is mounted at the mobile device 600. In addition, the memory 660 may include a non-volatile memory, a volatile memory, a hard disk drive (HDD), or a solid-state drive (SSD).

The controller 610 controls all operations of the mobile device 600 and a flow of signals between internal elements of the mobile device 600, and processes data. When a user input is received or a preset and stored condition is satisfied, the controller 610 may execute the OS and various applications stored in the memory 660.

The controller 610 may include a RAM that stores a signal or data input from an external source of the mobile device 600 or is used as a storage area corresponding to various operations performed by the mobile device 600, a ROM that stores a control program for controlling the mobile device 600, and a processor.

The controller 610 may perform one or more instructions stored in the memory 660, thereby performing a mirroring operation disclosed in the present specification.

The controller 610 may control the communication interface 620 to exchange a 360-degree image with the image display apparatus 100 connected for mirroring, may output, to the display 640, a sphere-type 360-degree image generated from the 360-degree image, may control a viewpoint of the sphere-type 360-degree image in response to a user input of controlling the viewpoint of the displayed sphere-type 360-degree image, and may transmit, to the image display apparatus 100, at least one among the 360-degree image, a selected viewpoint image of the 360-degree image, and viewpoint control information with respect to the 360-degree image so as to display the 360-degree image on the image display apparatus 100.

The controller 610 may obtain a 360-degree image, may change the obtained 360-degree image to a sphere-type 360-degree image, and thus may generate the sphere-type 360-degree image.

The controller 610 may receive the 360-degree image or a sphere-type 360-degree image generated based on the 360-degree image from the image display apparatus 100 connected for mirroring.

The controller 610 may control a viewpoint of the sphere-type 360-degree image by rotating and displaying the sphere-type 360-degree image according to a user input angle of view or by magnifying the sphere-type 360-degree image according to a user input zoom size.

An image corresponding to a selected viewpoint may include an image corresponding to a viewpoint determined according to a user input of controlling the sphere-type 360-degree image.

The controller 610 may transmit, to the image display apparatus 100, the viewpoint control information corresponding to a user input of controlling a viewpoint of the sphere-type 360-degree image.

The image corresponding to the selected viewpoint may include an image corresponding to a viewpoint determined by the image display apparatus 100 or information about the 360-degree image.

When the controller 610 transmits an image corresponding to a selected viewpoint in the 360-degree image to the image display apparatus 100, the controller 610 may process the image corresponding to the selected viewpoint, in consideration of an aspect ratio of the image display apparatus 100.

The controller 610 may divide the 360-degree image into one or more tasks for screen mirroring, and may delegate or allocate the one or more tasks to the mobile device 600 or the image display apparatus 100, in consideration of processing resources of the mobile device 600 and the image display apparatus 100.

The described functions performed by the controller 610 may be implemented in a manner that the controller 610 executes one or more applications stored in the memory 660.

In addition to the elements of FIG. 6, the mobile device 600 may further include an audio processor to perform processing on audio data, an audio output interface to output audio, and an input/output interface to receive video, audio, additional information, etc., from an external source of the mobile device 600.

The mobile device 600 is not limited to its name. That is, any electronic apparatus, including a laptop, a smartphone, a tablet PC, a wearable device, a PDA, or the like, which includes a processor and a memory and executes an application may be the mobile device 600.

The image display apparatus 100 includes a controller 110, a communication interface 120, a video processor 130, a display 140, and a memory 150.

The communication interface 120 allows the image display apparatus 100 to communicate with the mobile device 600 by using various mirroring techniques including screen mirroring, DLNA, Bluetooth, Miracast, Wi-Fi direct, or the like.

The video processor 130 may perform signal processing on an image to be displayed by the display 140, and may perform various image processing such as decoding, scaling, noise filtering, frame-rate conversion, resolution conversion, etc., on video data.

In particular, the graphics processor 131 may map a 2D 360-degree image to a sphere-type 360-degree image, or may project an image of an area corresponding to a selected viewpoint in the sphere-type 360-degree image. If a processing resource of the graphics processor 131 of the image display apparatus 100 is insufficient, the graphics processor 631 of the mobile device 600 may perform the mapping processing or the projection processing.

The display 140 generates a driving signal by converting an image signal, a data signal, an OSD signal, a control signal, etc., processed by the video processor 130. The display 140 may be embodied as a PDP, an LCD, an OLED, a flexible display, or the like, or may be embodied as a 3D display. In addition, the display 140 may be embodied as a touchscreen, thereby operating as both an output device and an input device.

The display 140 may display, by using a mirroring technique, an image of a display-target area corresponding to a selected viewpoint in a 360-degree image.

The display 140 may display an image of an area corresponding to a changed viewpoint, in response to a user input of controlling a viewpoint of the sphere-type 360-degree image displayed on the mobile device 600.

The memory 150 may include an OS, at least one item of data to be processed by the controller 110, and one or more instructions to be executed by the controller 110.

In particular, the memory 150 may include one or more instructions involving controlling the communication interface 120 to connect to the mobile device 600 for mirroring; receiving the 360-degree image from the mobile device 600 displaying the sphere-type 360-degree image generated from the 360-degree image, or transmitting the 360-degree image or the sphere-type 360-degree image so as to allow the sphere-type 360-degree image to be displayed on the mobile device 600; and controlling the display 140 to display an image corresponding to a selected viewpoint in the 360-degree image.

In the present exemplary embodiment, the term "memory" includes a storage, a ROM or RAM of a controller, or a memory card (e.g., a micro SD card, a USB memory, etc.) that is mounted at the image display apparatus 100. In addition, the memory 150 may include a non-volatile memory, a volatile memory, a HDD, or a SSD.

The controller 110 controls all operations of the image display apparatus 100 and a flow of signals between internal elements of the image display apparatus 100, and processes data. When a user input is received or a preset and stored condition is satisfied, the controller 110 may execute the OS and various applications stored in the memory 150.

The controller 110 may include a RAM that stores a signal or data input from an external source of the image display apparatus 100 or is used as a storage area corresponding to various operations performed by the image display apparatus 100, a ROM that stores a control program for controlling the image display apparatus 100, and a processor.

The controller 110 may execute the one or more instructions stored in the memory 150, thereby controlling the communication interface 120 to connect to the mobile device 600 for mirroring; receiving the 360-degree image from the mobile device 600 displaying the sphere-type 360-degree image generated from the 360-degree image, or transmitting the 360-degree image or the sphere-type 360-degree image so as to allow the sphere-type 360-degree image to be displayed on the mobile device 600; and controlling the display 140 to display an image corresponding to a selected viewpoint in the 360-degree image.

The controller 110 may receive, from the mobile device 600, viewpoint control information corresponding to a user input of controlling a viewpoint of the sphere-type 360-degree image displayed on the mobile device 600 or an image of an area in the 360-degree image corresponding to a viewpoint according to the user input, and may display an image corresponding to the selected viewpoint in the 360-degree image, based on the viewpoint control information or the image of the area in the 360-degree image corresponding to the viewpoint.

The described functions performed by the controller 110 may be implemented in a manner that the controller 110 executes one or more applications stored in the memory 150.

In addition to the elements of FIG. 6, the image display apparatus 100 may further include an audio processor to perform processing on audio data, an audio output interface to output audio, an input/output interface to receive video, audio, additional information, etc., from an external source of the image display apparatus 100, a tuner to receive a broadcasting signal, and a sensor to sense a user voice, a user image, and user interaction.

The block diagrams of the image display apparatus 100 or the mobile device 600 illustrated in FIG. 6 are exemplary. The elements in the block diagrams may be combined, added, or omitted according to actual specification of the image display apparatus 100 or the mobile device 600. That is, when required, two or more elements may be combined to be one element, or one element may be subdivided to two or more elements. In addition, a function performed in each block is provided to describe exemplary embodiments, and detailed operations of devices thereof do not limit the scope of the present disclosure.

Figure 7:
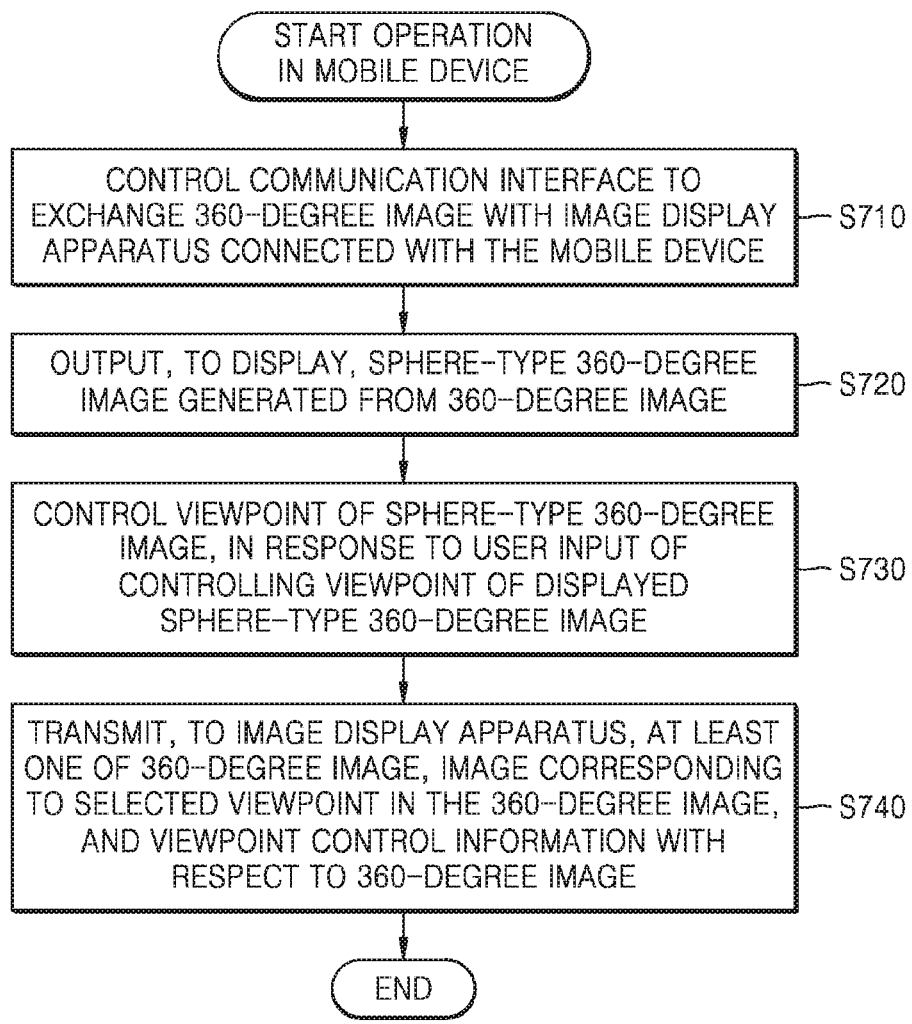
FIG. 7 is a flowchart of a procedure of operations in the mobile device connected for mirroring, according to an exemplary embodiment.

FIG. 7 is a flowchart of a procedure of operations in the mobile device 600 connected for mirroring, according to an exemplary embodiment.

Referring to FIG. 7, in operation S710, the mobile device 600 may control the communication interface 620 to exchange a 360-degree image with the image display apparatus 100 connected for mirroring.

When the mobile device 600 has the 360-degree image, the mobile device 600 may transmit the 360-degree image to the image display apparatus 100. Alternatively, when the image display apparatus 100 has the 360-degree image, the mobile device 600 may receive the 360-degree image from the image display apparatus 100.

In operation S720, the mobile device 600 may output, to the display 640, a sphere-type 360-degree image generated from the 360-degree image.

The mobile device 600 may receive, from the image display apparatus 100, the sphere-type 360-degree image generated from the 360-degree image.

The mobile device 600 may perform, by using the graphics processor 631, mapping processing by which the sphere-type 360-degree image is generated from the 360-degree image.

According to various exemplary embodiments, which one of the graphics processor 631 of the mobile device 600 and the graphics processor 131 of the image display apparatus 100 is to perform the mapping processing by which the sphere-type 360-degree image is generated from the 360-degree image may be flexibly determined in consideration of processing resources of the mobile device 600 and the image display apparatus 100.

In operation S730, the mobile device 600 may control a viewpoint of the sphere-type 360-degree image, in response to a user input of controlling the viewpoint of the displayed sphere-type 360-degree image.

In more detail, the mobile device 600 may display the sphere-type 360-degree image on the display 640, and may sense the user input of controlling the viewpoint of the displayed sphere-type 360-degree image. The viewpoint may include an angle of view at which a user views the 360-degree image, or a zooming degree. When the mobile device 600 senses the user input of controlling the viewpoint, the mobile device 600 may control the sphere-type 360-degree image displayed on the display 640. That is, according to a user input of controlling the angle of view, the mobile device 600 may rotate and display the sphere-type 360-degree image by the angle of view corresponding to the user input. According to a user input of controlling the zooming degree, the mobile device 600 may magnify or decrease the sphere-type 360-degree image displayed on the display 640.

In operation S740, the mobile device 600 may transmit, to the image display apparatus 100, at least one among the 360-degree image, an image corresponding to a selected viewpoint in the 360-degree image, and viewpoint control information with respect to the 360-degree image.

When the mobile device 600 has an original image of the 360-degree image, the mobile device 600 may transmit the 360-degree image to the image display apparatus 100.

The mobile device 600 may control rotation of the sphere-type 360-degree image displayed on the mobile device 600, according to the user input of controlling the viewpoint, and the image display apparatus 100 may display an image of an area corresponding to a selected viewpoint, regardless of the user input to the mobile device 600. In this case, it is sufficient for the mobile device 600 to transmit the 360-degree image or the image of the area corresponding to the selected viewpoint in the 360-degree image to the image display apparatus 100.

The mobile device 600 may control the rotation of the sphere-type 360-degree image displayed on the mobile device 600, according to the user input of controlling the viewpoint, and the image display apparatus 100 may display an image of an area corresponding to a viewpoint corresponding to the user input to the mobile device 600. In this case, the mobile device 600 may transmit, to the image display apparatus 100, viewpoint control information corresponding to the user input or the image of the area corresponding to the viewpoint corresponding to the user input, the area being in the 360-degree image.

If the mobile device 600 has information about an aspect ratio of the image display apparatus 100, the mobile device 600 may consider the aspect ratio of the image display apparatus 100 when the mobile device 600 projects the area corresponding to the viewpoint corresponding to the user input, the area being in the 360-degree image.

Figure 8:
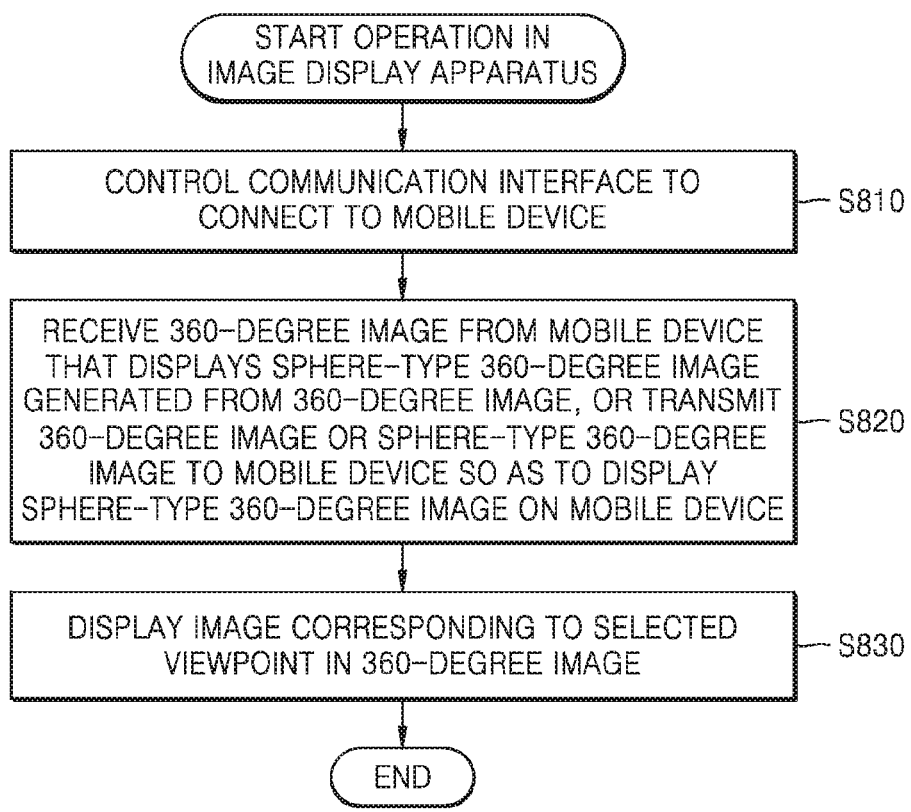
FIG. 8 is a flowchart of a procedure of operations in the image display apparatus connected for mirroring, according to an exemplary embodiment.

FIG. 8 is a flowchart of a procedure of operations in the image display apparatus 100 connected for mirroring, according to an exemplary embodiment.

Referring to FIG. 8, in operation S810, the image display apparatus 100 may control the communication interface 120 to exchange a 360-degree image with the mobile device 600 connected for mirroring.

When the image display apparatus 100 has a 360-degree image, the image display apparatus 100 may transmit the 360-degree image a sphere-type 360-degree image generated from the 360-degree image to the mobile device 600. Alternatively, when the mobile device 600 has the 360-degree image, the image display apparatus 100 may receive the 360-degree image from the mobile device 600.

In operation S820, the image display apparatus 100 may receive the 360-degree image from the mobile device 600 that displays the sphere-type 360-degree image generated from the 360-degree image, or may transmit the 360-degree image to the mobile device 600 so as to display the sphere-type 360-degree image on the mobile device 600.

When the 360-degree image is stored on the image display apparatus 100, the image display apparatus 100 may transmit the 360-degree image to the mobile device 600, or may map the 360-degree image to the sphere-type 360-degree image and may transmit the sphere-type 360-degree image to the mobile device 600. Whether to transmit the 360-degree image without a change or to map the 360-degree image to the sphere-type 360-degree image and transmit it may be appropriately determined in consideration of processing resources of the image display apparatus 100 and the mobile device 600.

In operation S830, the image display apparatus 100 may display, on the display 140, an image corresponding to a selected viewpoint in the 360-degree image.

The selected viewpoint may be fixed or changed. In more detail, the image display apparatus 100 may constantly display an image corresponding to a fixed viewpoint in the 360-degree image regardless of a viewpoint control according to a user input to the mobile device 600. Alternatively, the image display apparatus 100 may display an image of an area corresponding to a viewpoint according to a user input in a variable manner according to the user input to the mobile device 600, i.e., in a manner that the image display apparatus 100 reflects a viewpoint control according to the user input to the mobile device 600.

The image display apparatus 100 may constantly display, on the display 140, an image of an area in the 360-degree image, the area corresponding to a viewpoint set by the image display apparatus 100 or the mobile device 600. For example, the mobile device 600 or the image display apparatus 100 may determine a viewpoint of an area in the 360-degree image, wherein the area is to be displayed as a default.

The image display apparatus 100 may constantly display, on the display 140, an image corresponding to a viewpoint selected according to information about a 360-degree image. For example, the image display apparatus 100 may display an image corresponding to a viewpoint that is determined as a default in the 360-degree image.

The image display apparatus 100 may receive an image of an area in a 360-degree image from the mobile device 600, the area corresponding to a viewpoint according to a user input.

The image display apparatus 100 may receive viewpoint control information corresponding to the viewpoint according to the user input from the mobile device 600, may project, from the 360-degree image, an area corresponding to the viewpoint indicated by the viewpoint control information, and may display an image of the projected area on the display 140. For example, the viewpoint control information may include information about an angle of view or a zooming degree which corresponds to the user input.

According to various exemplary embodiments, whether the image display apparatus 100 receives the viewpoint control information from the mobile device 600 and projects the 360-degree image according to the viewpoint control information, or the image display apparatus 100 receives an image of an area projected based on the viewpoint control information from the mobile device 600 may be determined in consideration of processing resources of the mobile device 600 and the image display apparatus 100.

Figure 9:
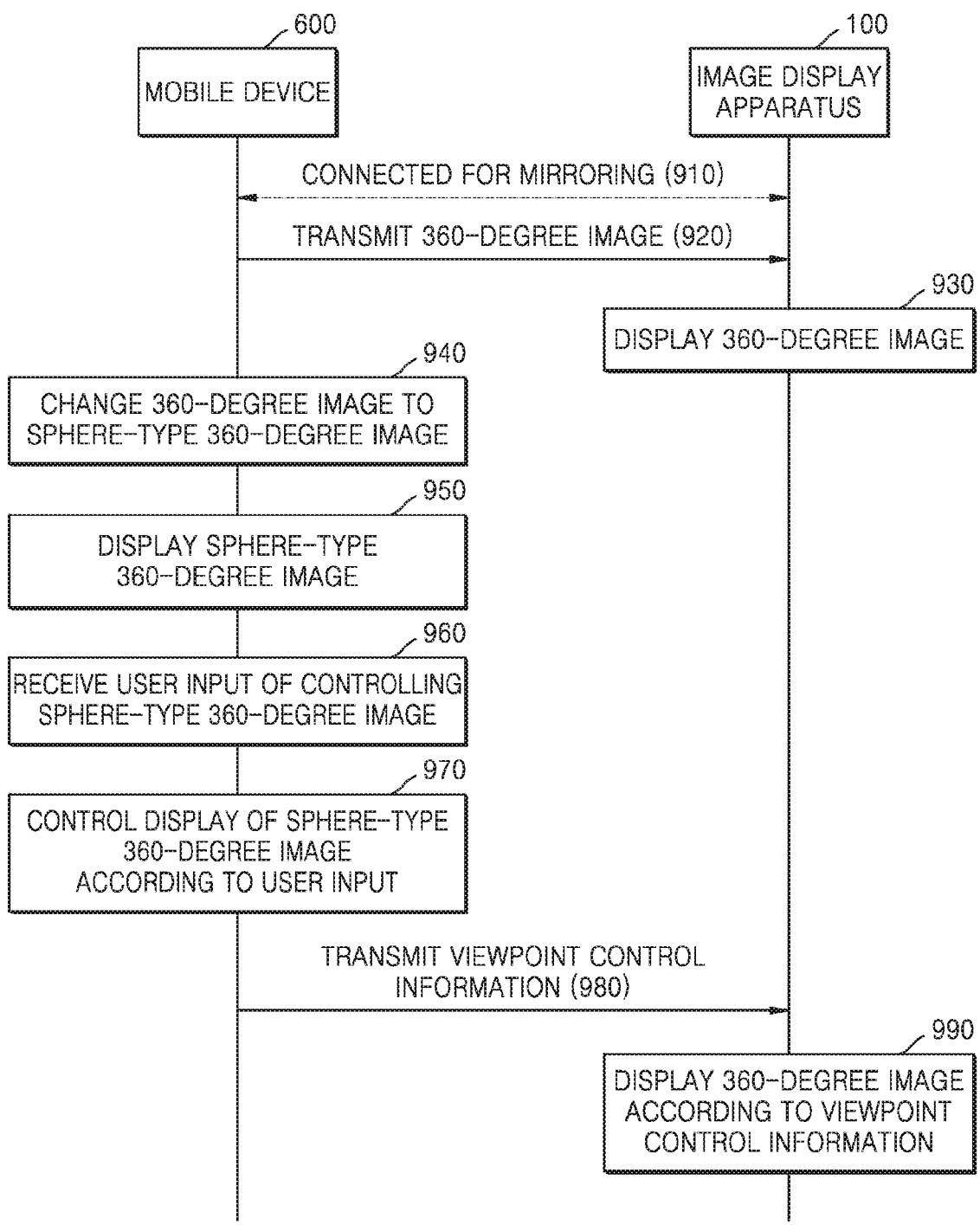
FIG. 9 is a flowchart of a mirroring operation between the mobile device having a 360-degree image and the image display apparatus, according to an exemplary embodiment.

FIG. 9 is a flowchart of a mirroring operation between the mobile device 600 having a 360-degree image and the image display apparatus 100, according to an exemplary embodiment.

Referring to FIG. 9, in operation 910, the mobile device 600 and the image display apparatus 100 may perform a connection operation for mirroring.

In operation 920, the mobile device 600 may transmit a 360-degree image to the image display apparatus 100 so as to mirror the 360-degree image. The mobile device 600 may transmit an original image of the 360-degree image, or if a processing resource of the mobile device 600 is available, the mobile device 600 may project an area corresponding to a selected viewpoint in the 360-degree image, and may display an image of the projected area. In addition, if the mobile device 600 has information about an aspect ratio of the image display apparatus 100, the mobile device 600 may consider the aspect ratio of the image display apparatus 100 during a projection processing operation In operation 930, the image display apparatus 100 may project the area corresponding to the selected viewpoint in the 360-degree image which is received from the mobile device 600, and may display an image of the projected area.

In operation 940, the mobile device 600 may map the 360-degree image to a sphere-type 360-degree image.

In operation 950, the mobile device 600 may display the sphere-type 360-degree image on a display.

In operation 960, the mobile device 600 may receive a user input of controlling the sphere-type 360-degree image.

Figure 10A:
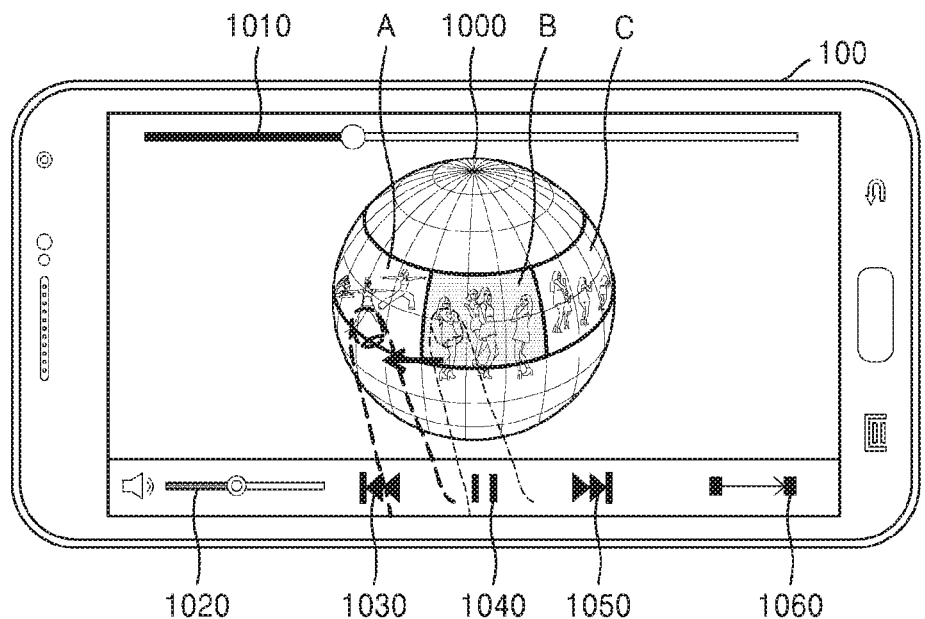
FIGS. 10A and 10B illustrate examples of a sphere-type 360-degree image to be displayed on the mobile device, according to an exemplary embodiment.
Figure 10B:
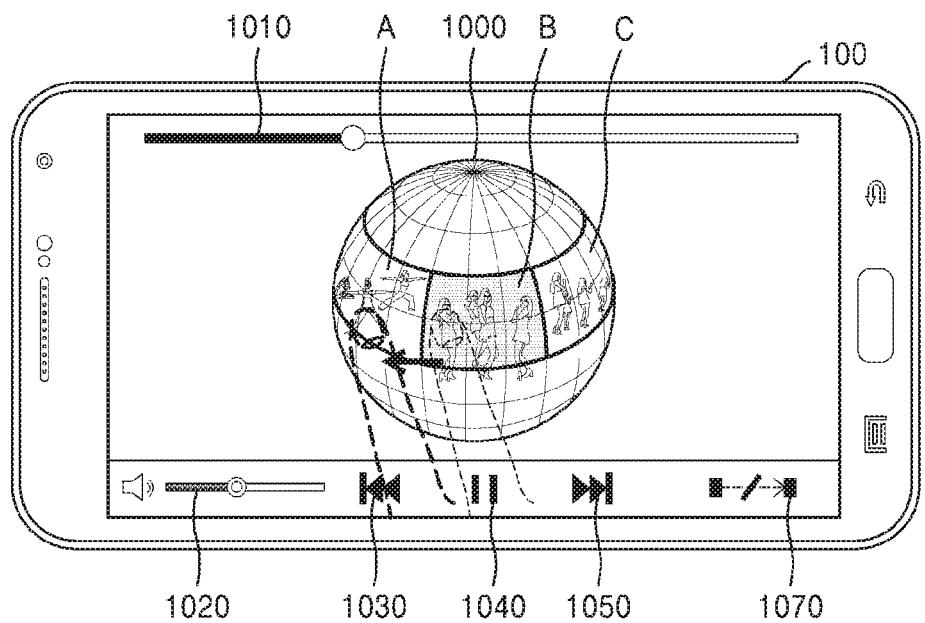

FIGS. 10A and 10B illustrate examples of a sphere-type 360-degree image 1000 to be displayed on the mobile device 600, according to an exemplary embodiment.

Referring to FIG. 10A, a display of the mobile device 600 may display not only the sphere-type 360-degree image 1000, but also one or more control menus. The one or more control menus may include a progress bar 1010 indicating a current reproduction point from among an entire length of a 360-degree image, a volume bar 1020, a rewind menu 1030, a pause menu 1040, a fast-forward menu 1050, an item 1060, or the like. When the mobile device 600 receives a user input corresponding to a control menu, the mobile device 600 may control a display of the sphere-type 360-degree image 1000 displayed on the mobile device 600, according to the user input corresponding to the control menu, and may also transmit control information based on the user input corresponding to the control menu to the image display apparatus 100. The image display apparatus 100 may control a display of the 360-degree image displayed on the image display apparatus 100, by using the control information based on the control menu which is received from the mobile device 600.

In addition, a user may control a viewpoint of the sphere-type 360-degree image 1000. For example, if the mobile device 600 has a touchscreen, the user may move, change or select the viewpoint of the sphere-type 360-degree image 1000 displayed on the touchscreen by performing a touch input, a drag input, a gesture input, etc., by using a finger or another input tool. For example, the user may perform a drag motion to the left on the sphere-type 360-degree image 1000 by using a finger so as to rotate the sphere-type 360-degree image 1000 to the left, and the mobile device 600 may receive a user input thereof.

In operation 970, the mobile device 600 may control the displaying of the sphere-type 360-degree image according to the user input.

For example, referring to FIG. 10A, when the mobile device 600 receives the user input of performing the drag motion to the left on the sphere-type 360-degree image 1000, the mobile device 600 may control a display so as to allow the sphere-type 360-degree image 1000 to rotate to the left. In a case where an area of the sphere-type 360-degree image 1000 which corresponds to a viewpoint is B and is controlled to rotate to the left, an area C may be the area that corresponds to the viewpoint.

In operation 980, the mobile device 600 may transmit viewpoint control information to the image display apparatus 100. The viewpoint control information may be information for controlling a viewpoint determined according to a user input, and may include information about an angle of view or a zooming degree which corresponds to the user input.

According to an exemplary embodiment, if a processing resource of the mobile device 600 is sufficient, the mobile device 600 may not transmit the viewpoint control information, but may perform projection processing on an area determined according to the viewpoint control information and may directly transmit an image of the projected area to the image display apparatus 100.

In operation 990, the image display apparatus 100 may receive the viewpoint control information from the mobile device 600, may project the area that corresponds to the viewpoint in the 360-degree image, and may display the image of the projected area.

Referring to FIG. 10A, the one or more control menus displayed on the mobile device 600 may include the item 1060 indicating that a viewpoint of the 360-degree image displayed on a screen of the image display apparatus 100 is variable according to a viewpoint of the 360-degree image of the mobile device 600. That is, while the item 1060 is displayed, a control with respect to a viewpoint of the sphere-type 360-degree image 1000 on the mobile device 600 may be used in controlling a viewpoint of the 360-degree image displayed on the image display apparatus 100, so that, if the user adjusts the view point of the 360-degree image by using the mobile device 600, the viewpoint of the image display apparatus 100 may be adjusted accordingly.

Figure 11:
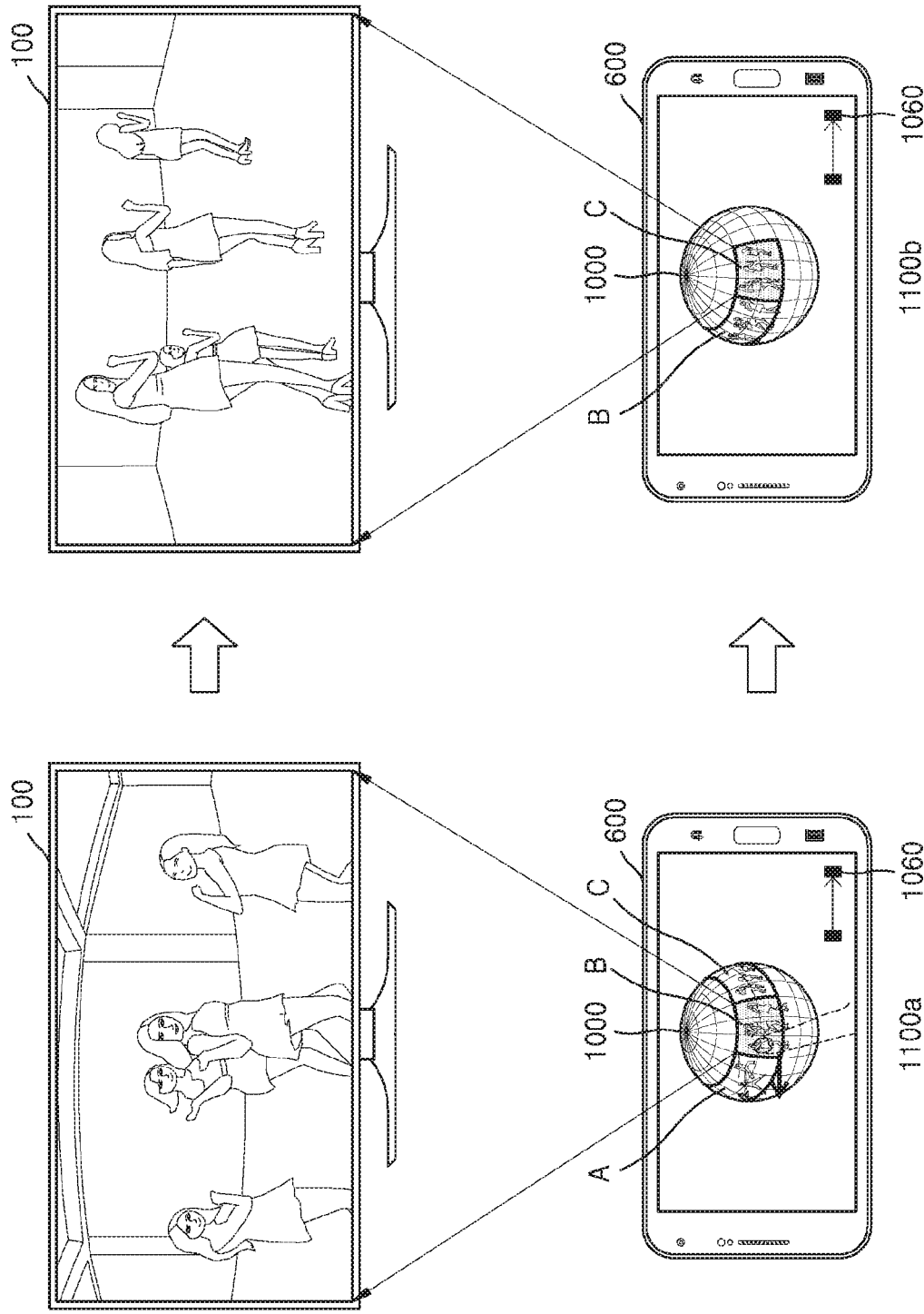
FIG. 11 is a reference diagram for describing an operation while an item is displayed on the mobile device, according to an exemplary embodiment.

FIG. 11 is a reference diagram for describing an operation while the item 1060 is displayed on the mobile device 600, according to an exemplary embodiment.

Referring to 1100a of FIG. 11, an area B of the sphere-type 360-degree image 1000 is displayed as an area corresponding to a viewpoint on the mobile device 600, and the item 1060 is displayed on the mobile device 600. In addition, the area B of the sphere-type 360-degree image 1000 which corresponds to the viewpoint displayed on the mobile device 600 is projected and displayed on the image display apparatus 100. While the item 1060 is displayed on the mobile device 600, when a user drags the sphere-type 360-degree image 1000 displayed on the mobile device 600 to the left, as illustrated in 1100b of FIG. 11, the mobile device 600 rotates the sphere-type 360-degree image 1000 to the left and displays the sphere-type 360-degree image 1000 so that, for example, an area C is displayed as an area corresponding to the viewpoint of the sphere-type 360-degree image 1000. In addition, because the mobile device 600 is in a state in which the item 1060 is displayed on the mobile device 600, i.e., the mobile device 600 is in a mode of transmitting viewpoint control information of the mobile device 600 to the image display apparatus 100, the mobile device 600 may transmit viewpoint control information corresponding to the area C to the image display apparatus 100 so that the image display apparatus 100 may display an image corresponding to the area C.

The item 1060 illustrated in FIG. 10A may be a toggling type. That is, when the user touches once the item 1060 displayed on a screen of FIG. 10A, the item 1060 may be changed to an item 1070 as illustrated in FIG. 10B. The item 1070 indicates that a control with respect to a viewpoint of the 360-degree image on the mobile device 600 is not used in controlling a viewpoint of the 360-degree image displayed on the image display apparatus 100, and the viewpoint of the 360-degree image displayed on the image display apparatus 100 is fixed.

Figure 12:
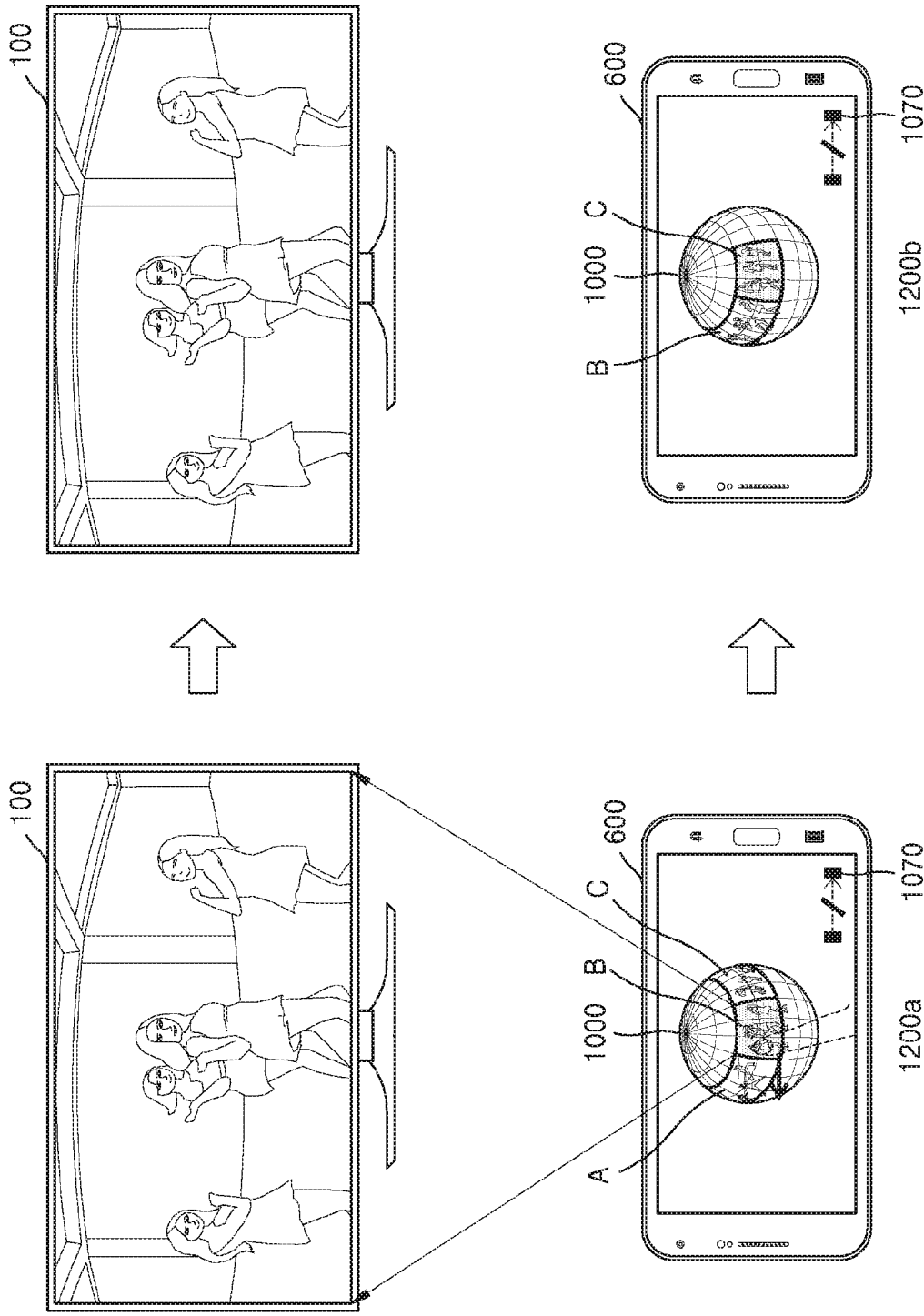
FIG. 12 is a reference diagram for describing an operation in a mode in which an item is displayed on the mobile device, according to an exemplary embodiment.

Referring to 1200a of FIG. 12, while the item 1070 is displayed on the mobile device 600, when the user drags the sphere-type 360-degree image 1000 displayed on the mobile device 600 to the left, as illustrated in 1200b of FIG. 12, the sphere-type 360-degree image 1000 displayed on the mobile device 600 may rotate to the left and thus an area C may be displayed as an area corresponding to a viewpoint. However, according to a mode in which the item 1070 is displayed, i.e., because it is a mode in which a viewpoint of the 360-degree image displayed on the image display apparatus 100 is fixed, the image display apparatus 100 may constantly display an image corresponding to the area B regardless of the control with respect to the viewpoint of the mobile device 600.

That is, according to the input of touching the item 1060, the user may fix an execution screen of the sphere-type 360-degree image 1000, and may view an image of another angle of view by moving only an execution screen of the mobile device 600. In addition, if the user wants to view an execution screen of the image display apparatus 100 which is changed according to an image control with respect to the mobile device 600, the user may touch the item 1070.

Figure 13:
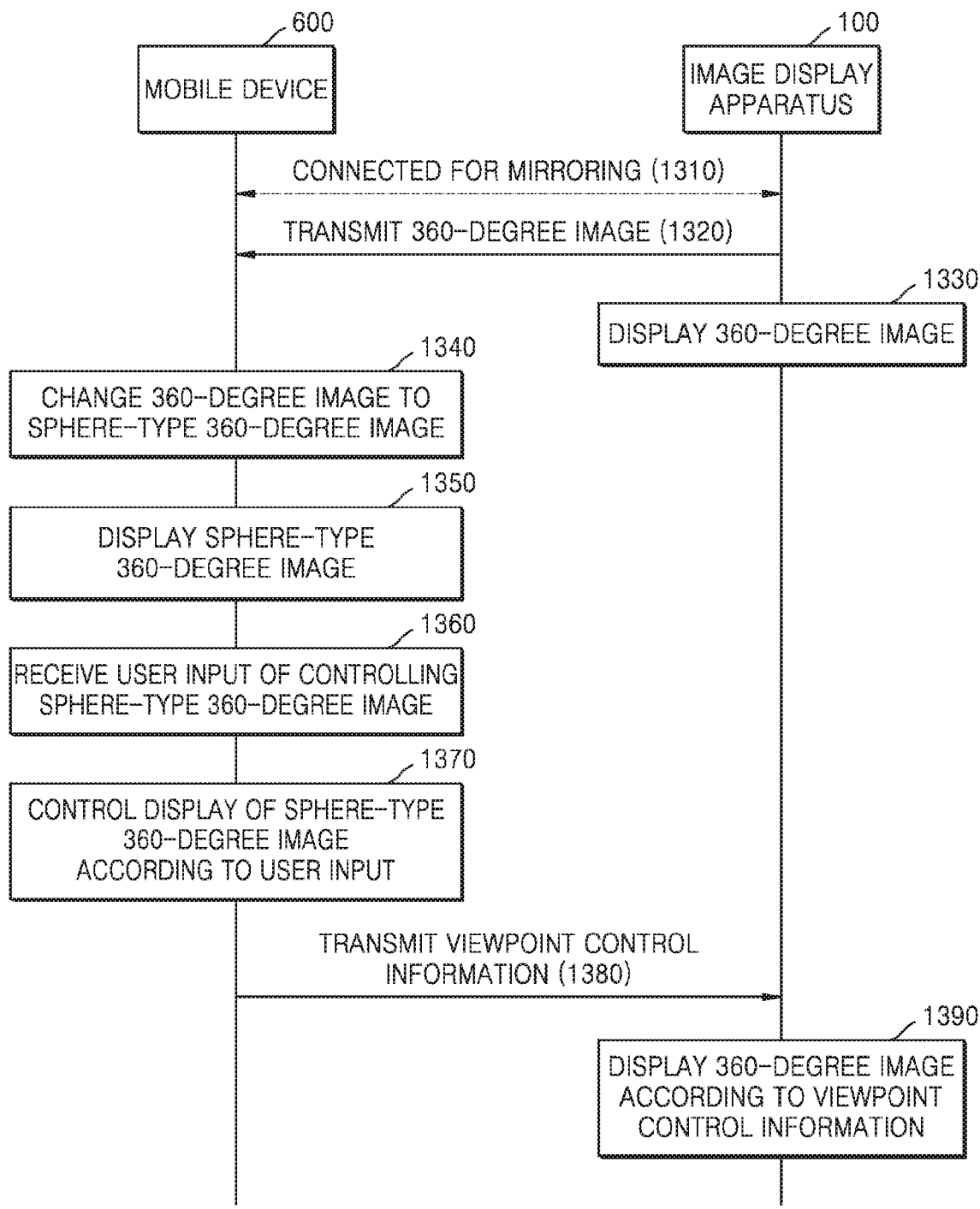
FIG. 13 is a flowchart of a mirroring operation between the image display apparatus having a 360-degree image and the mobile device, according to an exemplary embodiment.

FIG. 13 is a flowchart of a mirroring operation between the image display apparatus 100 having a 360-degree image and the mobile device 600, according to an exemplary embodiment. Descriptions of features similar to those of FIG. 9 are briefly provided.

Referring to FIG. 13, in operation 1310, the mobile device 600 and the image display apparatus 100 may perform a connection operation for mirroring.

In operation 1320, the image display apparatus 100 may transmit a 360-degree image to the mobile device 600 so as to mirror the 360-degree image. The image display apparatus 100 may transmit an original image of the 360-degree image, in consideration of a processing resource of the mobile device 600, or may map the 360-degree image to a sphere-type 360-degree image and may transmit the sphere-type 360-degree image.

In operation 1330, the image display apparatus 100 may project an area corresponding to a selected viewpoint in the 360-degree image, and may display an image of the projected area.

In operation 1340, the mobile device 600 may map the 360-degree image received from the image display apparatus 100 to a sphere-type 360-degree image.

In operation 1350, the mobile device 600 may display the sphere-type 360-degree image on the display 640.

In operation 1360, the mobile device 600 may receive a user input of controlling the sphere-type 360-degree image.

In operation 1370, the mobile device 600 may control a display of the sphere-type 360-degree image, according to the user input.

In operation 1380, the mobile device 600 may transmit viewpoint control information to the image display apparatus 100. The viewpoint control information may be information for controlling a viewpoint determined according to a user input, and may include information about an angle of view or a zooming degree according to the user input.

According to an exemplary embodiment, if a processing resource of the mobile device 600 is sufficient, the mobile device 600 may not transmit the viewpoint control information but may perform projection processing on an area determined according to the viewpoint control information and may directly transmit an image of the projected area to the image display apparatus 100.

In operation 1390, the image display apparatus 100 may receive the viewpoint control information from the mobile device 600, may project the area that corresponds to the viewpoint in the 360-degree image, and may display the image of the projected area.

According to the exemplary embodiment illustrated in FIG. 13, mirroring connection between the mobile device 600 and the image display apparatus 100 is completed before the 360-degree image is displayed on the image display apparatus 100. However, even when a connection request from the mobile device 600 is present while the image display apparatus 100 displays the 360-degree image, the image display apparatus 100 may operate in a same manner. That is, while the image display apparatus 100 displays the 360-degree image, if the image display apparatus 100 detects the connection request from the mobile device 600, the image display apparatus 100 may transmit an original image of the 360-degree image to the mobile device 600, or may generate the sphere-type 360-degree image by mapping the 360-degree image to a sphere and may transmit the sphere-type 360-degree image to the mobile device 600.

According to the above-discussed exemplary embodiments, when the 360-degree image is displayed while mirrored to the mobile device 600 and the image display apparatus 100, a control of a viewpoint of the 360-degree image may be easily performed by using the mobile device 600.

The methods of operating the mobile device and the image display apparatus according to the exemplary embodiments may be embodied as programmed commands to be executed in various computer units, and then may be recorded in a non-transitory computer-readable recording medium. The non-transitory computer-readable recording medium may include one or more of the programmed commands, data files, data structures, or the like. The programmed commands recorded to the non-transitory computer-readable recording medium may be particularly designed or configured or may be well known to one of ordinary skill in the art. Examples of the non-transitory computer-readable recording medium include magnetic media including hard disks, magnetic tapes, and floppy disks, optical media including CD-ROMs and DVDs, magneto-optical media including floptical disks, and hardware designed to store and execute the programmed commands in ROM, RAM, a flash memory, and the like. Examples of the programmed commands include not only machine code generated by a compiler but also include a high-level programming language to be executed in a computer by using an interpreter.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by one of ordinary skill in the art that various changes in form and details may be made therein without departing from the spirit and scope as defined by the following claims.

What is claimed is:

1. A mobile device comprising:
a communication interface;
a display;
a memory configured to store one or more instructions; and
at least one processor configured to execute the one or more instructions stored in the memory to:
control the communication interface to communicate with an image display apparatus and exchange information regarding a 360-degree image for screen mirroring;
control the display of the mobile device to display a sphere-type image generated from the 360-degree image and representing the 360-degree image to control a viewpoint of the 360-degree image displayed on the image display apparatus, the 360-degree image being a single image including a plurality of images captured in 360-degree directions by using at least one camera;
receive an input for controlling the sphere-type image;
generate information on the viewpoint based on the input for controlling the sphere-type image; and
control the communication interface to transmit, to the image display apparatus, the generated information on the viewpoint, so that the image display apparatus selects the viewpoint of the 360-degree image based on the generated information on the viewpoint and displays the selected viewpoint of the 360-degree image, wherein the sphere-type image is generated by rolling the single image and mapping it to a sphere, wherein the 360-degree image comprises a plurality of viewpoints, wherein the sphere-type image displayed on the mobile device comprises the selected viewpoint displayed on the image display apparatus and other adjacent viewpoints, and wherein the other adjacent viewpoints are not displayed on the image display apparatus while the selected viewpoint is displayed on the image display apparatus.

2. The mobile device of claim 1, wherein the at least one processor is further configured to execute the one or more instructions stored in the memory to:
receive the 360-degree image from the image display apparatus, and
generate the sphere-type image by mapping the 360-degree image to a sphere.

3. The mobile device of claim 1, wherein the at least one processor is further configured to execute the one or more instructions stored in the memory to control the communication interface to receive the sphere-type image from the image display apparatus.

4. The mobile device of claim 1, wherein the at least one processor is further configured to execute the one or more instructions stored in the memory to control the viewpoint of the sphere-type image by rotating the sphere-type image based on an angle of view according to the input, or by magnifying the sphere-type image based on a zooming degree according to the input.

5. The mobile device of claim 1, wherein the information on the viewpoint of the 360-degree image comprises at least one among an image corresponding to the viewpoint of the 360-degree image, and viewpoint control information corresponding to the viewpoint of the 360-degree image.

6. The mobile device of claim 1, wherein the at least one processor is further configured to execute the one or more instructions stored in the memory to:

display, on the display, an item representing one of a first state and a second state;
in response to the first state, stop transmitting, to the image display apparatus, the information on the selected viewpoint of the 360-degree image; and
in response to the second state, resume transmitting to the image display apparatus, the information on the viewpoint of the 360-degree image.

7. The mobile device of claim 1, wherein the at least one processor is further configured to execute the one or more instructions stored in the memory to determine the image corresponding to the viewpoint further based on at least one among information about the 360-degree image and information about the image display apparatus.

8. The mobile device of claim 1, wherein the at least one processor is further configured to execute the one or more instructions stored in the memory to process the image corresponding to the viewpoint based on an aspect ratio of the image display apparatus.

9. The mobile device of claim 1, wherein the at least one processor is further configured to generate one or more tasks for the screen mirroring, and allocate each of the one or more tasks to one among the mobile device and the image display apparatus based on processing resources of the mobile device and the image display apparatus.

10. An image display apparatus comprising:
a communication interface;
a display;
a memory configured to store one or more instructions; and
at least one processor configured to execute the one or more instructions stored in the memory to:
control the communication interface to communicate with a mobile device and exchange information regarding a 360-degree image screen mirroring;
receive, from the mobile device, information on a viewpoint which is generated based on an input for controlling a sphere-type image that is generated from the 360-degree image, is representative of the 360-degree image and is displayed on the mobile device;
select the viewpoint of the 360-degree image based on the information on the viewpoint, the 360-degree image being a single image including a plurality of images captured in 360-degree directions by using at least one camera; and control the display to display an image corresponding to the selected viewpoint of the 360-degree image, wherein the sphere-type image is generated by rolling the single image and mapping it to a sphere, wherein the 360-degree image comprises a plurality of viewpoint, wherein the sphere-type image displayed on the mobile device comprises the selected viewpoint displayed on the image display apparatus and other adjacent viewpoints, and wherein the other adjacent viewpoints are not displayed on the image display apparatus while the selected viewpoint is displayed on the image display apparatus.

11. The image display apparatus of claim 10, wherein the information on the viewpoint of the 360-degree image comprises at least one among an image corresponding to the viewpoint of the 360-degree image, and viewpoint control information corresponding to the viewpoint of the 360-degree image.

12. The image display apparatus of claim 11, wherein the viewpoint control information comprises at least one among an angle of view of the 360-degree image and a zooming degree of the 360-degree image.

13. A method of operating a mobile device, the method comprising:
communicating with an image display apparatus;
exchanging information regarding a 360-degree image for screen mirroring;
displaying a sphere-type image generated from the 360-degree image and representative of the 360-degree image on a display of the mobile device to control a viewpoint of the 360-degree image displayed on the image display apparatus, the 360-degree image being a single image including a plurality of images captured in 360-degree directions by using at least one camera;
receiving an input for controlling the sphere-type image;
generating information on the viewpoint based on the input for controlling the sphere-type image; and
transmitting, to the image display apparatus, the generated information on the viewpoint, so that the image display apparatus selects the viewpoint of the 360-degree image based on the generated information on the viewpoint and displays the selected viewpoint of the 360-degree image, wherein the sphere-type image is generated by rolling the single image and mapping it to a sphere, wherein the 360-degree image comprises a plurality of viewpoints, wherein the sphere-type image displayed on the mobile device comprises the selected viewpoint displayed on the image display apparatus and other adjacent viewpoints, and wherein the adjacent viewpoints are not displayed on the image display apparatus while the selected viewpoint is displayed on the image display apparatus.

14. The method of claim 13, further comprising receiving the 360-degree image or the sphere-type image generated based on the 360-degree image from the image di splay apparatus.

15. The method of claim 13, further comprising controlling the viewpoint of the sphere-type image comprising at least one among rotating the sphere-type image based on an angle of view according to the input, or by magnifying the sphere-type image based on a zooming degree according to the input.

16. The method of claim 13, wherein the information on the viewpoint of the 360-degree image comprises at least one among an image corresponding to the viewpoint of the 360-degree image, and viewpoint control information corresponding to the viewpoint of the 360-degree image.

17. The method of claim 13, further comprising:
displaying, on the display, an item representing one of a first state and a second state;
in response to the first state, stopping transmitting, to the image display apparatus, the information on the viewpoint of the 360-degree image; and
in response to the second state, resuming transmitting to the image display apparatus, the information on the viewpoint of the 360-degree image.

18. A method of operating an image display apparatus, the method comprising:
exchanging, with a mobile device, information regarding a 360-degree image for screen mirroring;
receiving, from the mobile device, information on a viewpoint which is generated based on an input for controlling a sphere-type image that is generated from the 360-degree image, is representative of a 360-degree image and is displayed on the mobile device;
selecting the viewpoint of the 360-degree image based on the information on the viewpoint, the 360-degree image being a single image including a plurality of images captured in 360-degree directions by using at least one camera; and displaying an image corresponding to the selected viewpoint of the 360-degree image, wherein the sphere-type image is generated by rolling the single image and mapping it to a sphere, wherein the 360-degree image comprises a plurality of viewpoints, wherein the sphere-type image displayed on the mobile device comprises the selected viewpoint displayed on the image display apparatus and other adjacent viewpoints, and wherein the adjacent viewpoints are not displayed on the image display apparatus while the selected viewpoint is displayed on the image display apparatus.

19. The method of claim 18, wherein the information on the viewpoint of the 360-degree image comprises at least one among an image corresponding to the viewpoint of the 360-degree image, and viewpoint control information corresponding to the viewpoint of the 360-degree image.

20. A non-transitory computer readable recording medium having recorded thereon a computer-readable program for implementing the method of claim 13.

* * * * *